(12) United States Patent
Sato et al.

(10) Patent No.: US 10,136,068 B2
(45) Date of Patent: Nov. 20, 2018

(54) IMAGING APPARATUS

(71) Applicant: Sony Corporation, Tokyo (JP)

(72) Inventors: Mayuko Sato, Tokyo (JP); Fumikazu Hatanaka, Tokyo (JP); Toshiyuki Kaimi, Tokyo (JP)

(73) Assignee: Sony Corporation, Tokyo (JP)

( * ) Notice: Subject to any disclaimer, the term of this patent is extended or adjusted under 35 U.S.C. 154(b) by 80 days.

(21) Appl. No.: 15/300,091

(22) PCT Filed: Mar. 25, 2015

(86) PCT No.: PCT/JP2015/059064
§ 371 (c)(1),
(2) Date: Sep. 28, 2016

(87) PCT Pub. No.: WO2015/170522
PCT Pub. Date: Nov. 12, 2015

(65) Prior Publication Data
US 2017/0187964 A1    Jun. 29, 2017

(30) Foreign Application Priority Data

May 8, 2014    (JP) ................. 2014-097045
May 15, 2014   (JP) ................. 2014-101707

(51) Int. Cl.
*H04N 5/225*    (2006.01)
*H04N 5/232*    (2006.01)
(Continued)

(52) U.S. Cl.
CPC ......... *H04N 5/23293* (2013.01); *G03B 13/02* (2013.01); *G03B 17/04* (2013.01);
(Continued)

(58) Field of Classification Search
CPC .... H04N 5/2329; H04N 5/232; H04N 5/2341; H04N 5/23293; H04N 5/23241;
(Continued)

(56) References Cited

U.S. PATENT DOCUMENTS 6,431,768 B1    8/2002  Nakamura
7,046,287 B2*   5/2006  Nishino .............. H04M 1/0216
                                              348/333.06

(Continued)

FOREIGN PATENT DOCUMENTS

JP    60-121431 A    6/1985
JP    H05-244474 A   9/1993
(Continued)

OTHER PUBLICATIONS

Extended European Search Report dated Mar. 31, 2017 for corresponding European Application No. 15789611.9.

*Primary Examiner* — Hung Lam
(74) *Attorney, Agent, or Firm* — Michael Best & Friedrich LLP

(57) ABSTRACT

An imaging apparatus includes: a main body provided with an imaging section; a viewfinder that makes a state transition between a housed state in which the viewfinder is housed in the main body and a usage state in which the viewfinder is projected from the main body; and a control section that turns on or turns off power in response to the state transition.

19 Claims, 19 Drawing Sheets

(51) Int. Cl.
 *G03B 17/04* (2006.01)
 *G03B 13/02* (2006.01)
 *G03B 17/18* (2006.01)

(52) U.S. Cl.
 CPC ......... *H04N 5/2251* (2013.01); *H04N 5/2252* (2013.01); *H04N 5/232* (2013.01); *H04N 5/23241* (2013.01); *G03B 17/18* (2013.01)

(58) Field of Classification Search
 CPC .... H04N 5/2252; H04N 5/2251; G03B 13/02; G03B 17/04; G03B 17/18
 See application file for complete search history.

(56) References Cited

U.S. PATENT DOCUMENTS

| | | | |
|---|---|---|---|
| 7,084,919 B2 * | 8/2006 | Shibata | H04M 1/021 348/333.06 |
| 2002/0196358 A1 * | 12/2002 | Kim | H04N 5/2251 348/333.06 |
| 2009/0168353 A1 * | 7/2009 | Kato | H04N 5/2252 361/697 |
| 2017/0187964 A1 * | 6/2017 | Sato | H04N 5/23293 |

FOREIGN PATENT DOCUMENTS

| | | |
|---|---|---|
| JP | 2001-268402 A | 9/2001 |
| JP | 2002-374432 A | 12/2002 |
| JP | 2013-138376 A | 7/2013 |

\* cited by examiner

[ FIG. 1 ]
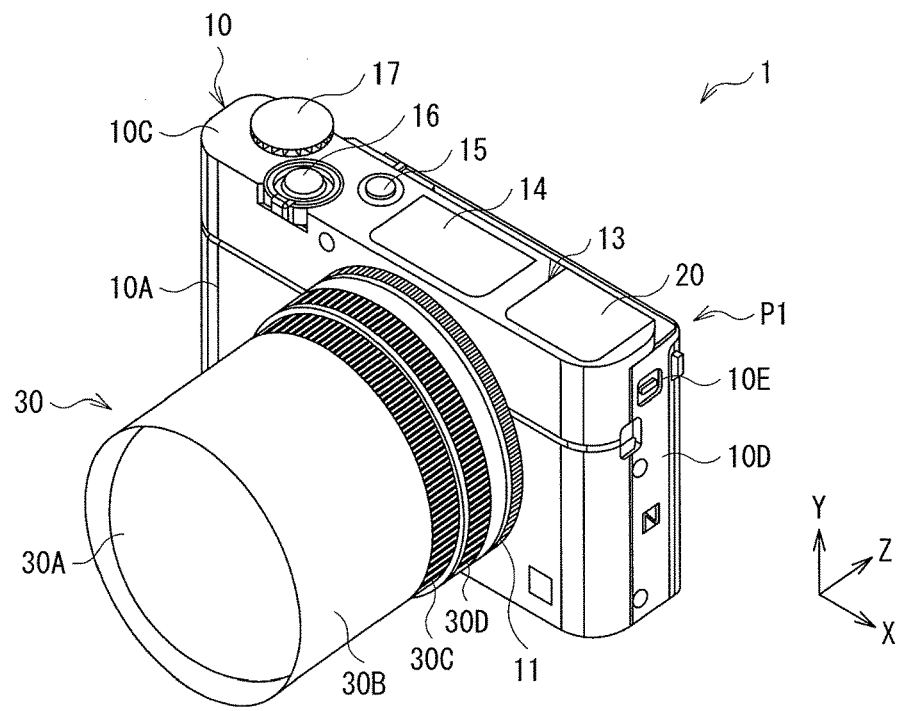
[ FIG. 2 ]
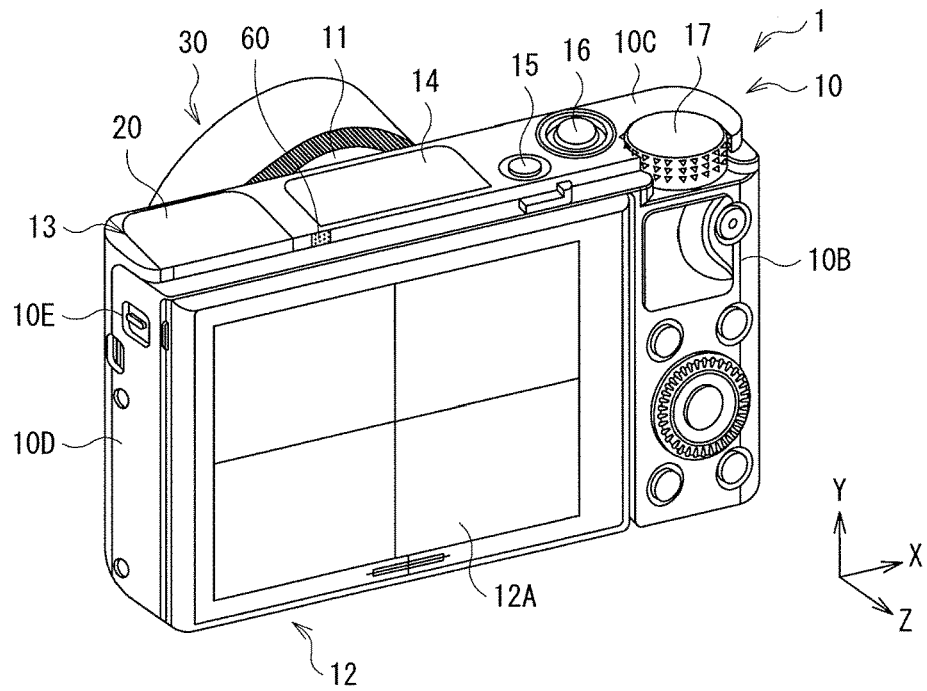

[ FIG. 3 ]
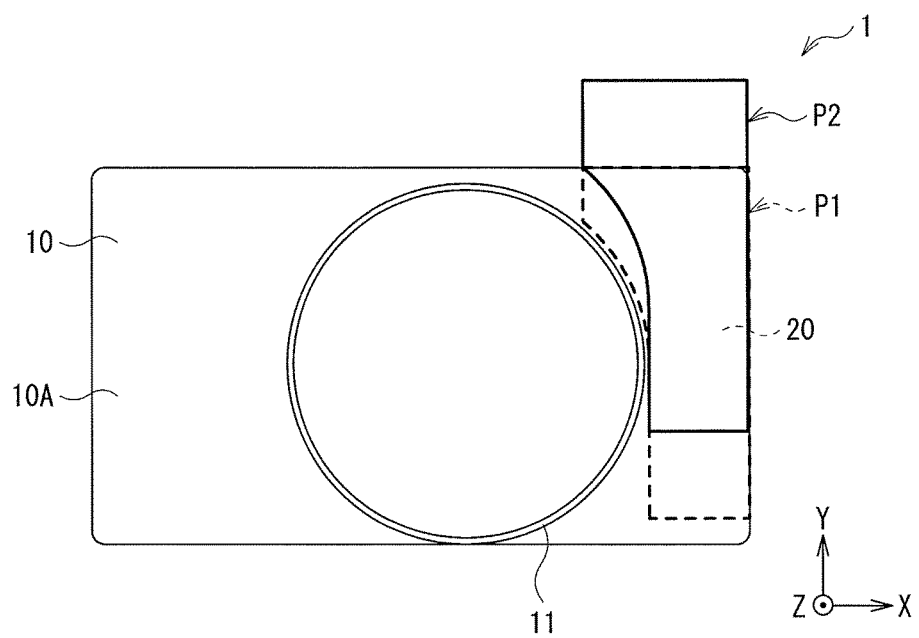

[FIG. 4]
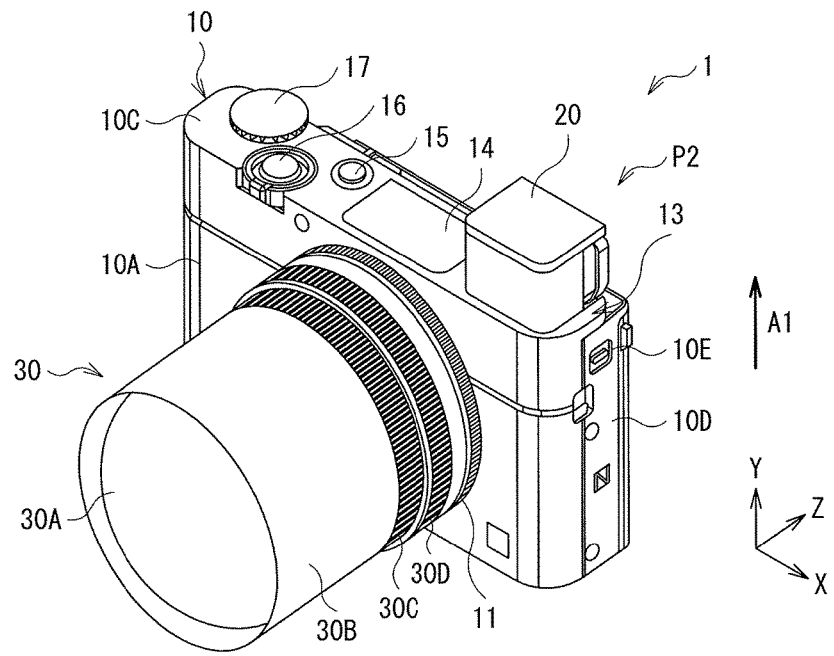
[FIG. 5]
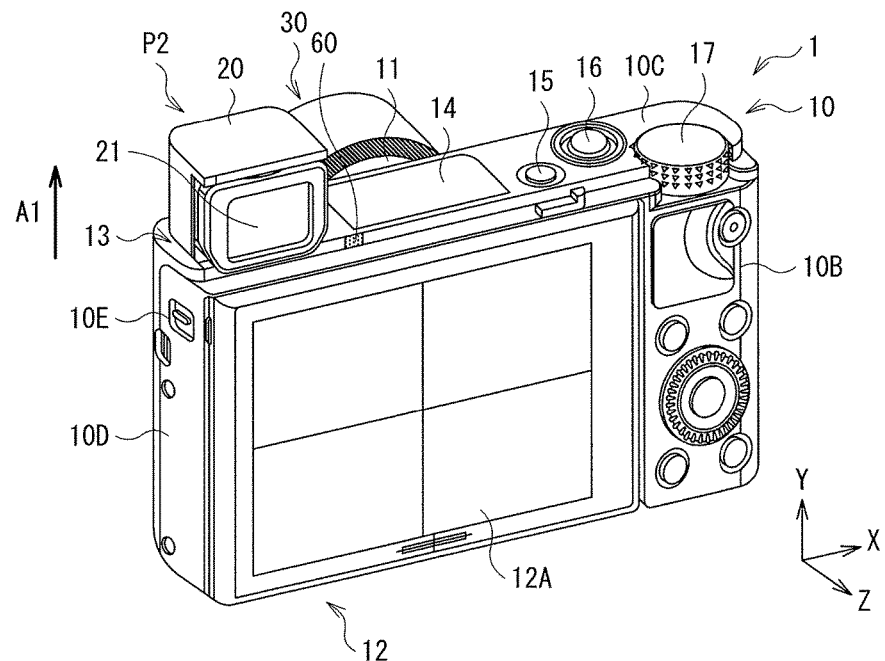

[ FIG. 6 ]
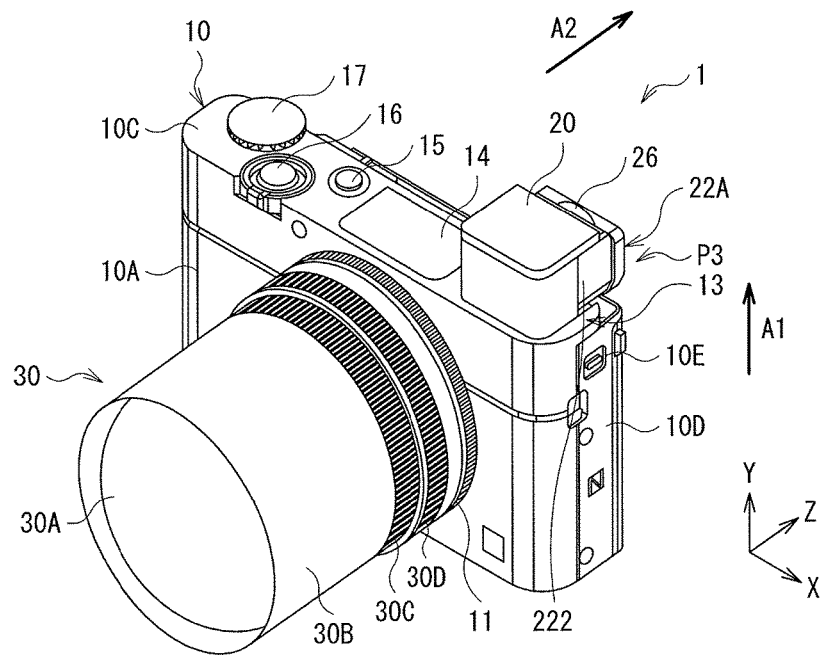
[ FIG. 7 ]
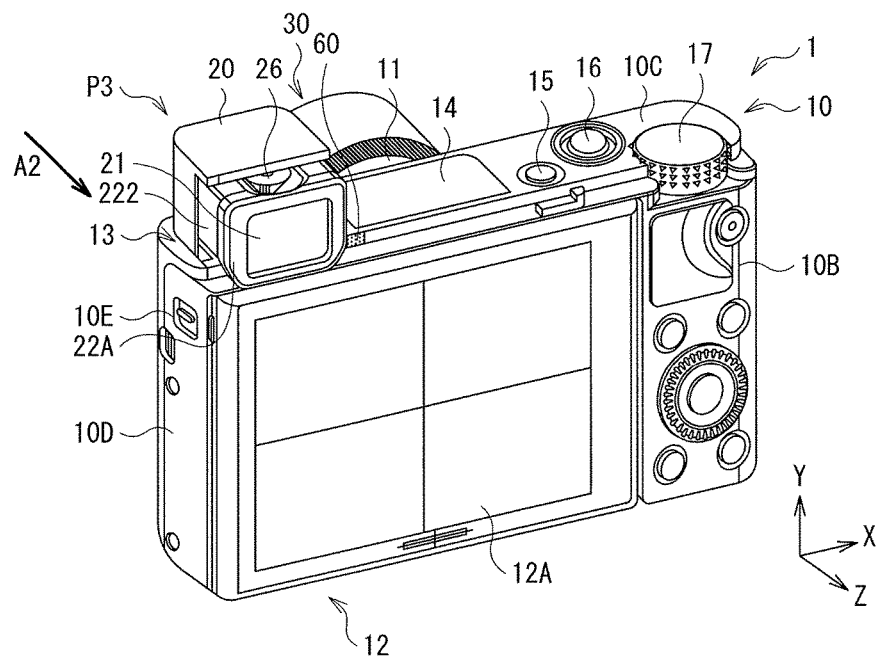

[ FIG. 8 ]
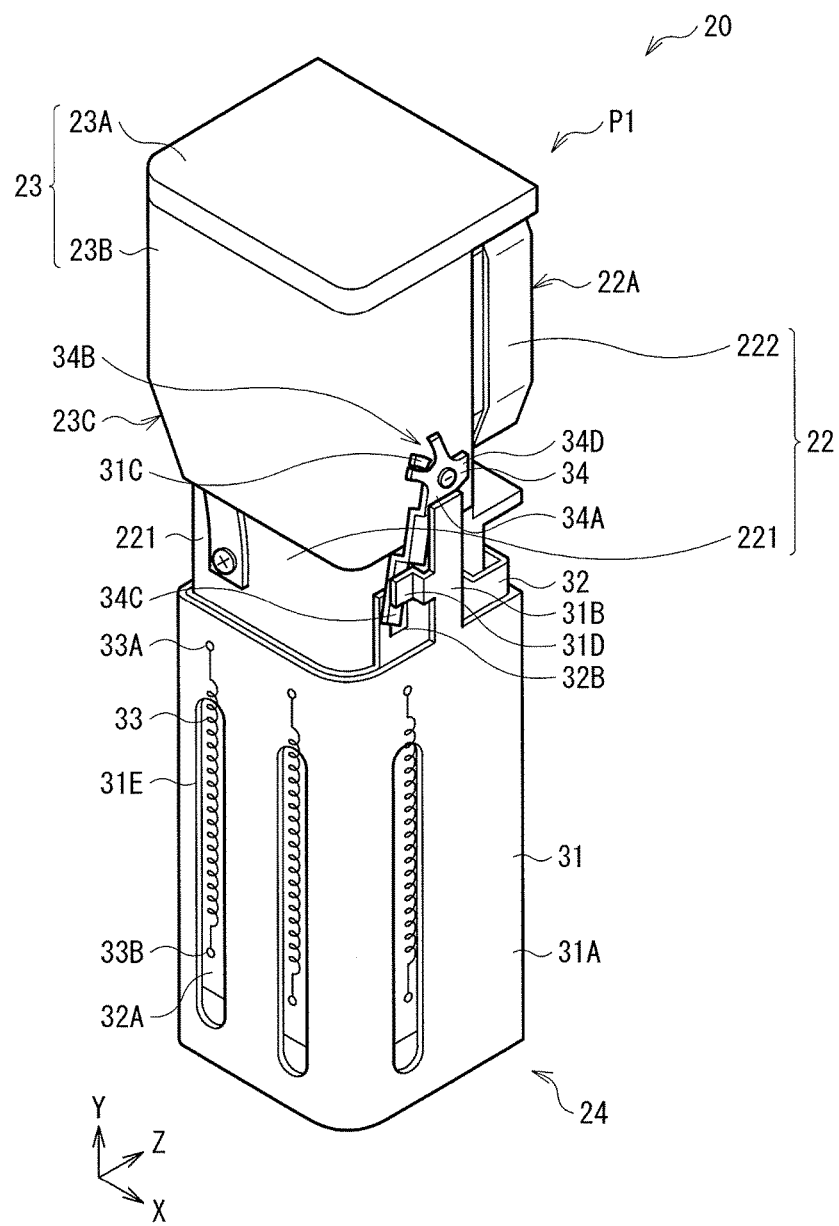

[ FIG. 9 ]
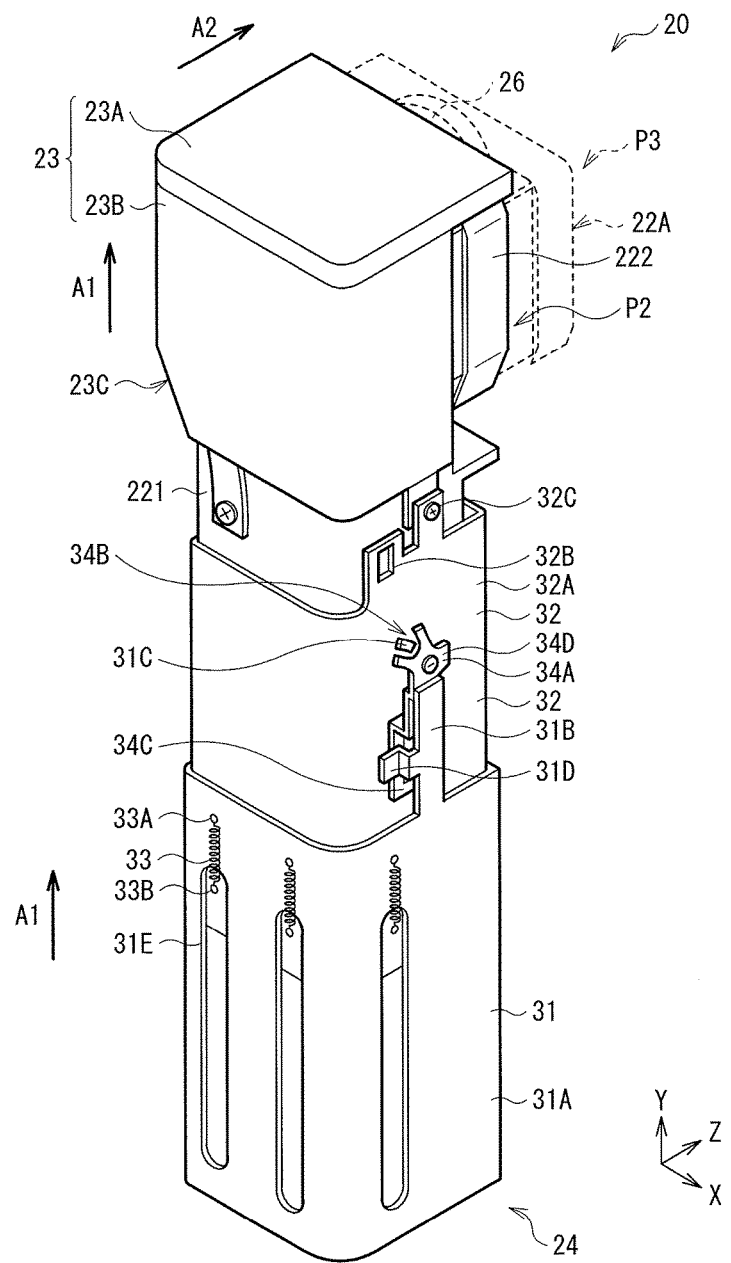

[FIG. 10A]
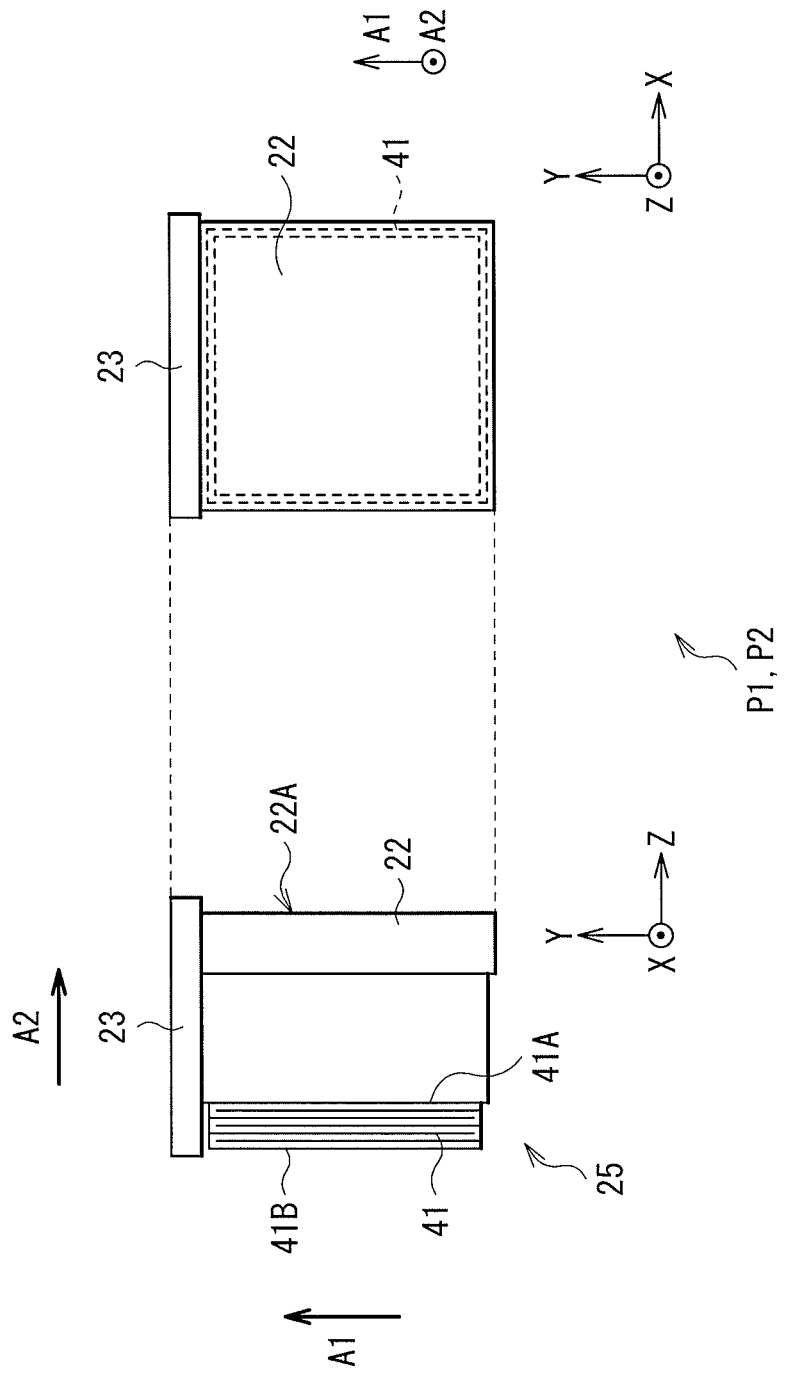

[ FIG. 10B ]
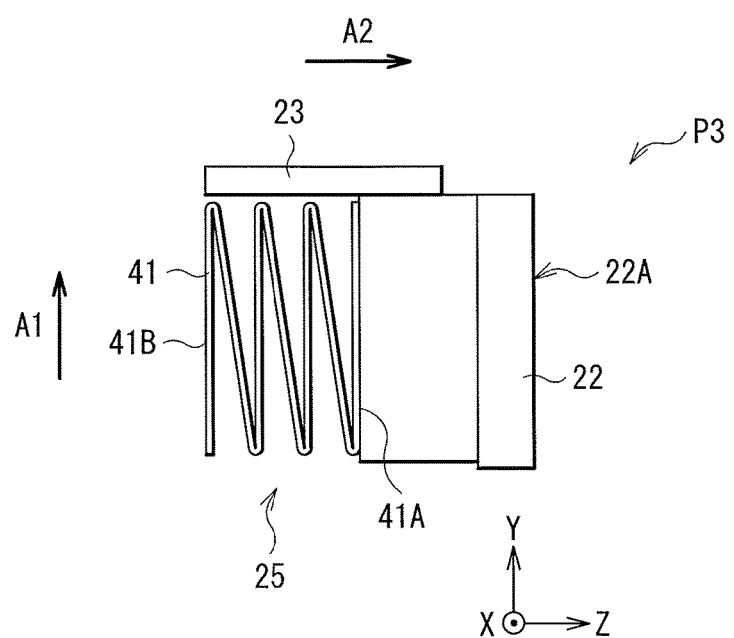

[ FIG. 11A ]
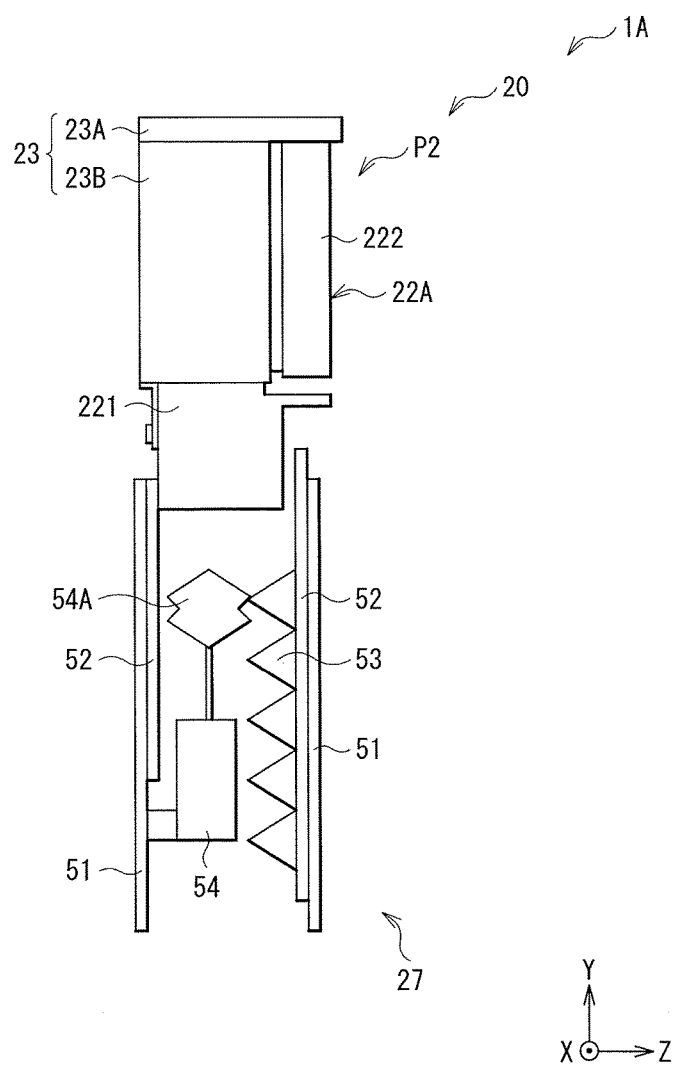

[ FIG. 11B ]
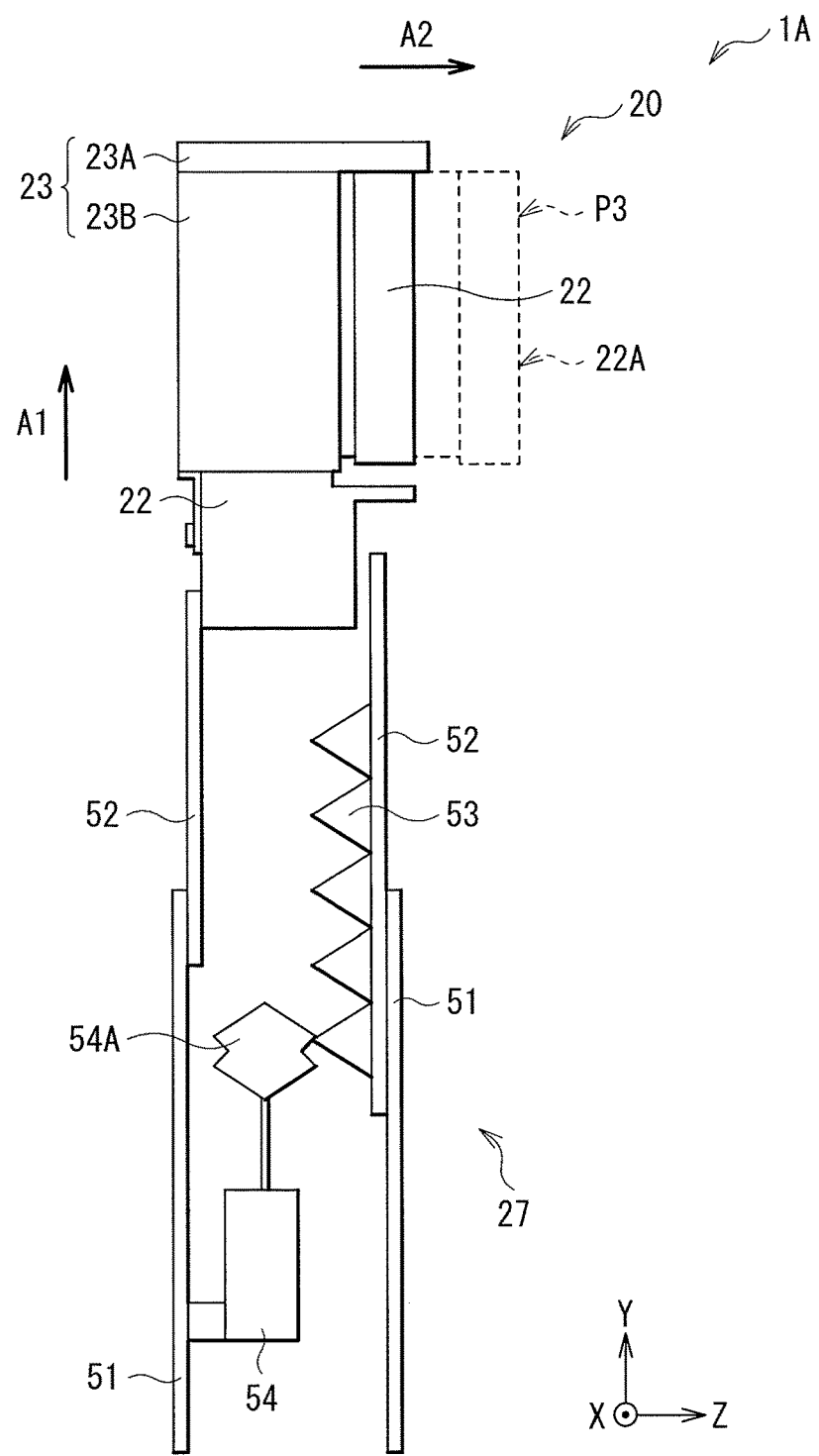

[ FIG. 12 ]
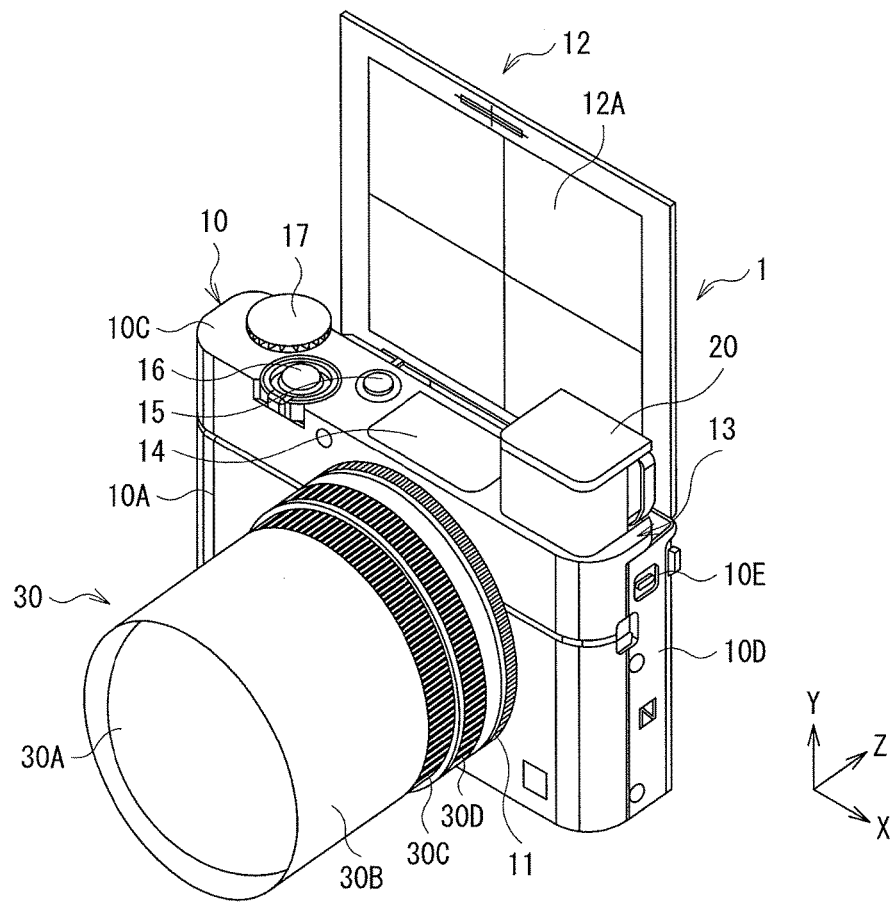

[ FIG. 13A ]
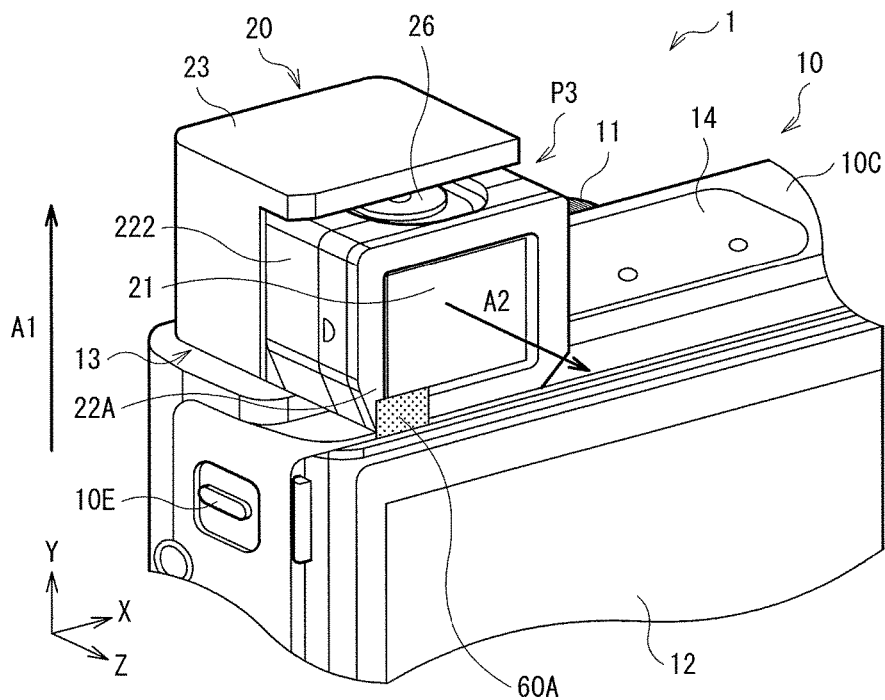
[ FIG. 13B ]
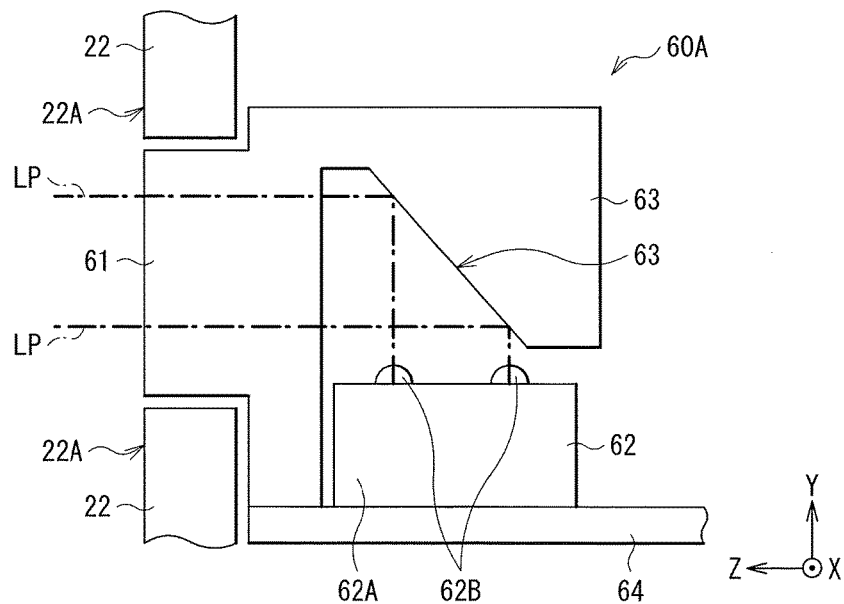

[ FIG. 14 ]
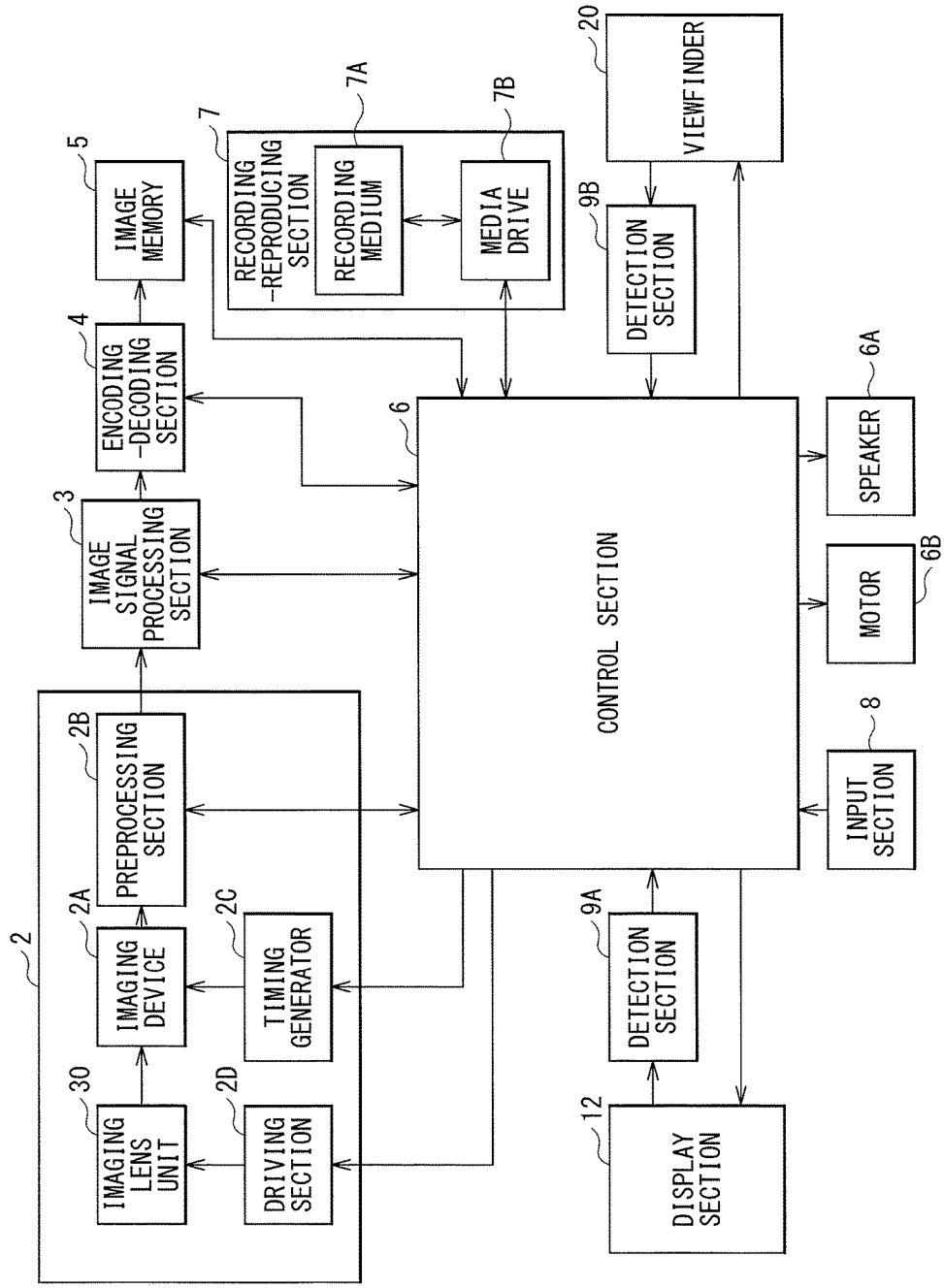

[ FIG. 15 ]
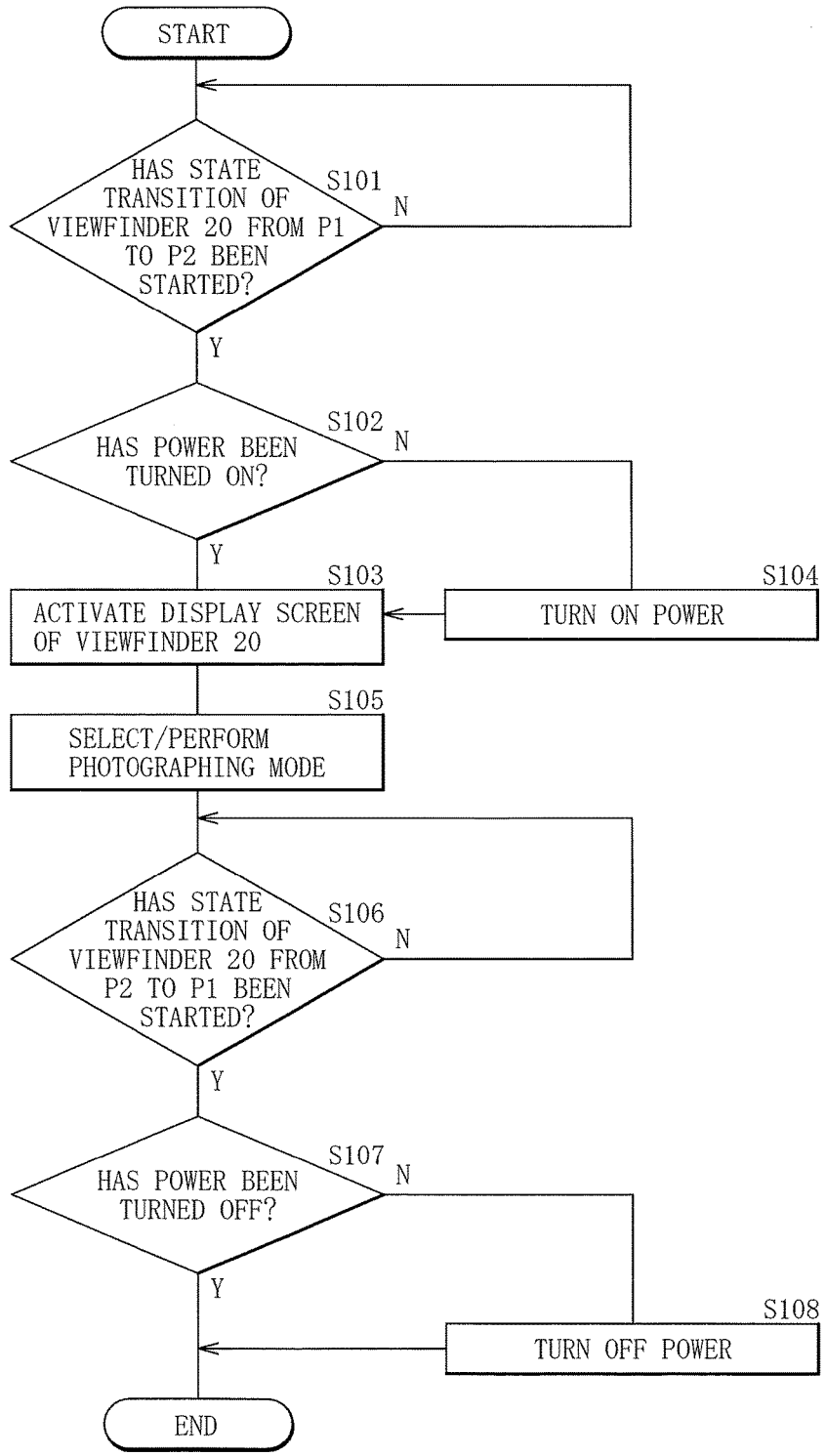

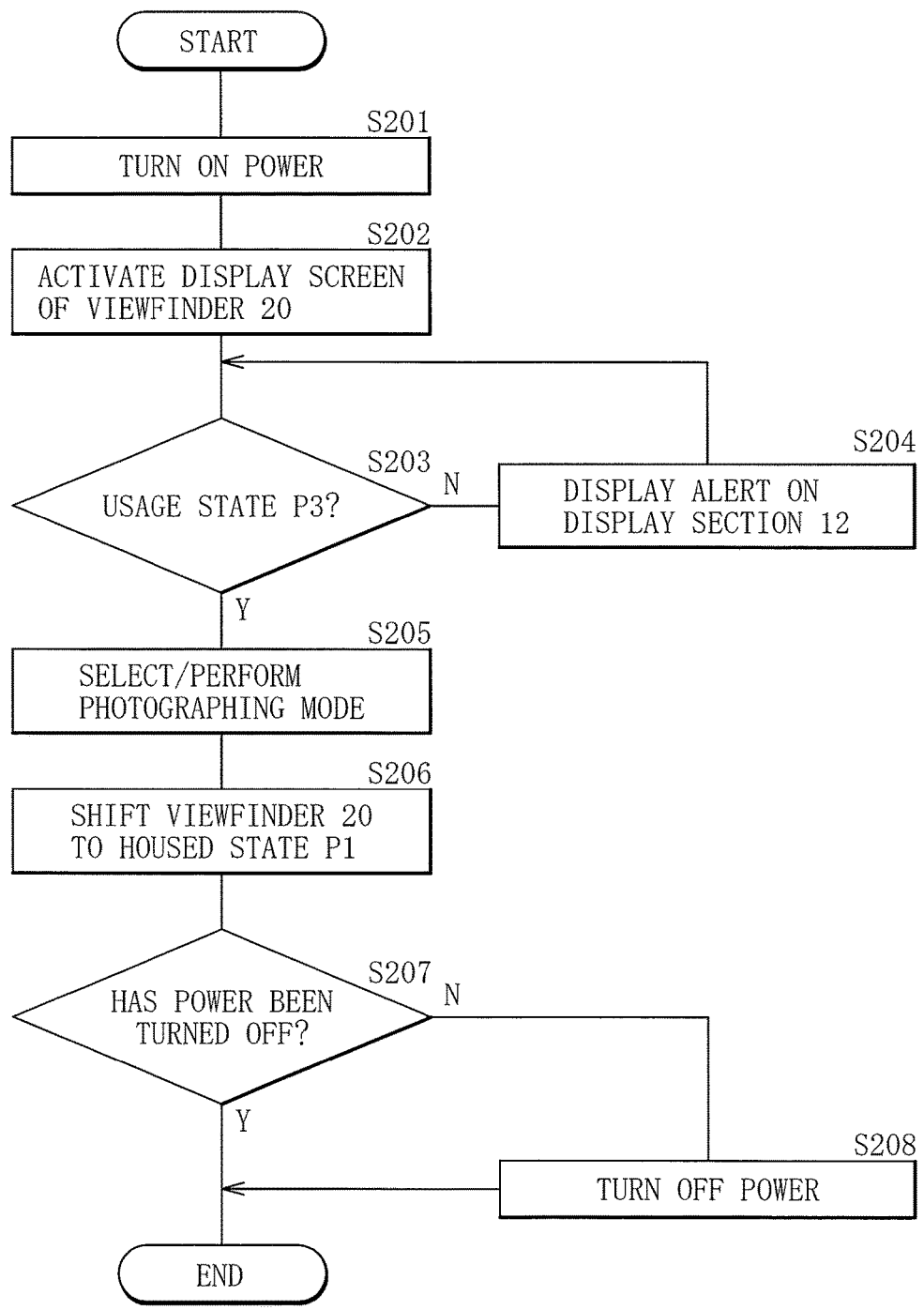
[ FIG. 16A ]

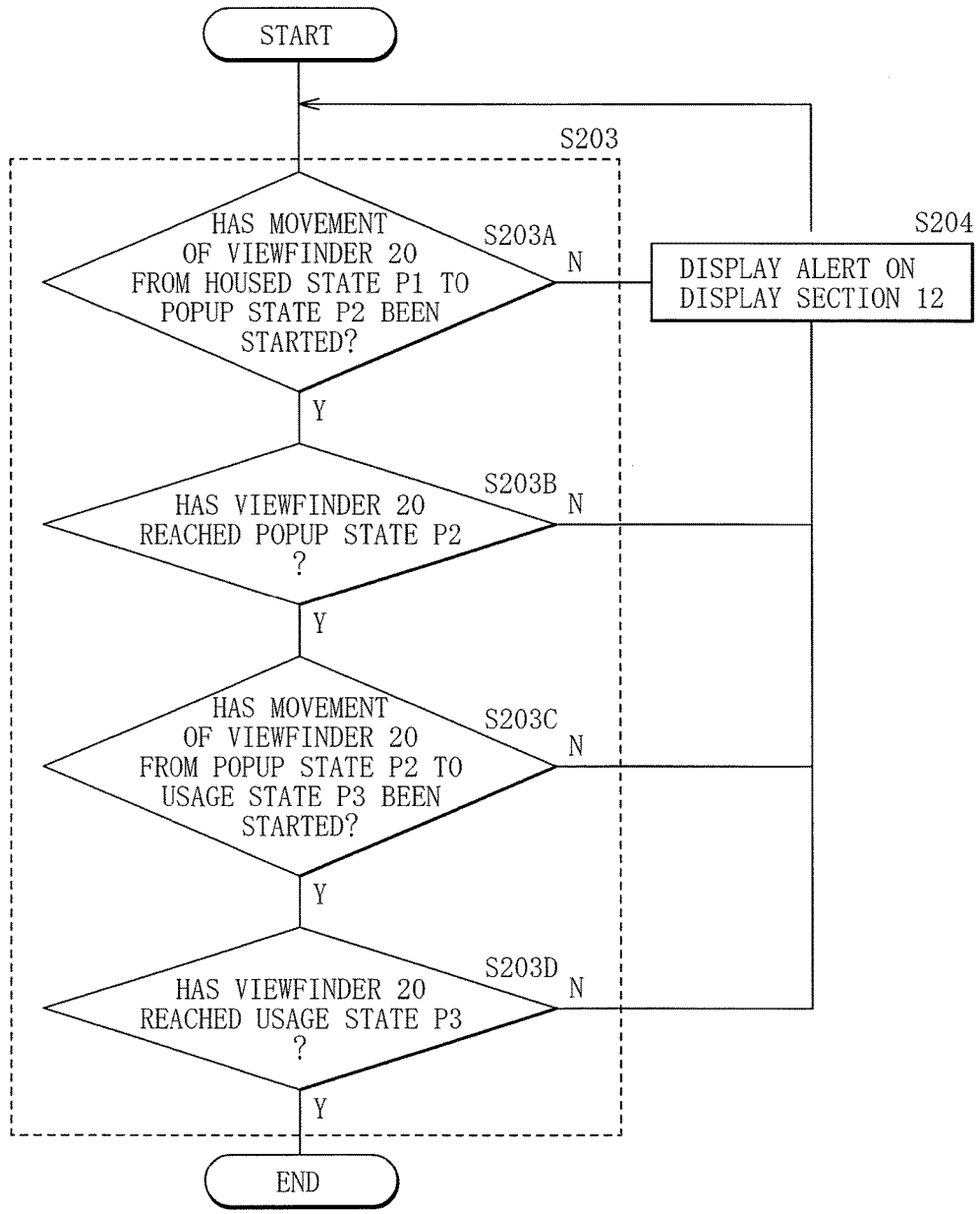
[ FIG. 16B ]

[ FIG. 16C ]
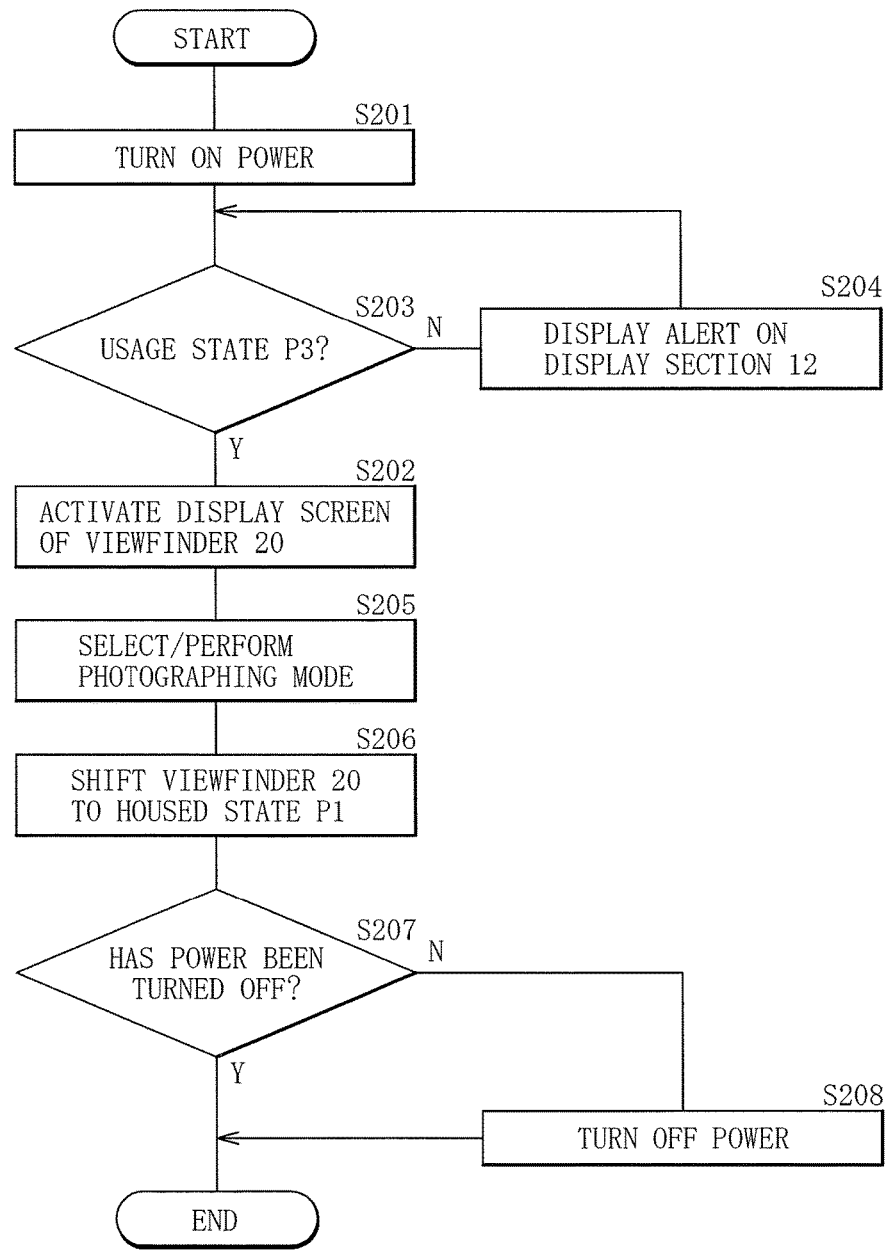

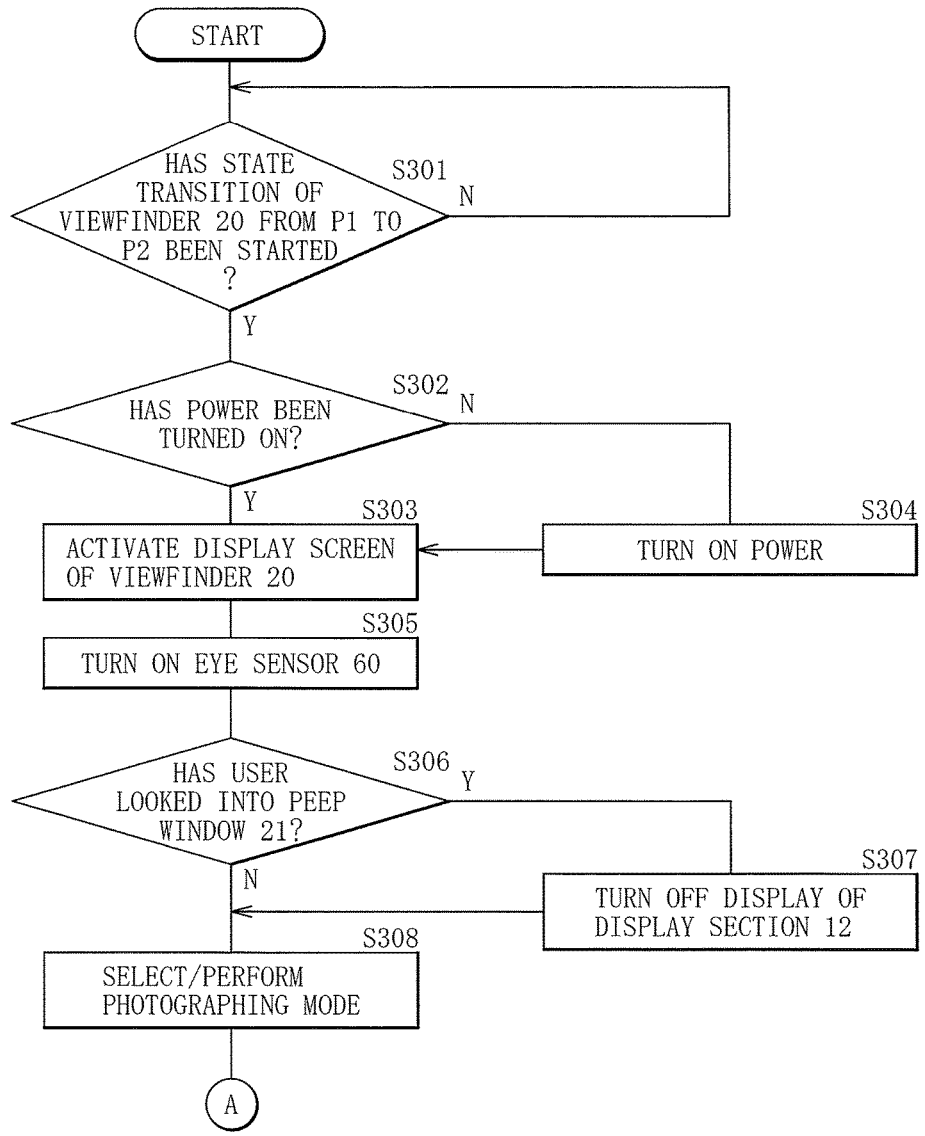
[ FIG. 17A ]

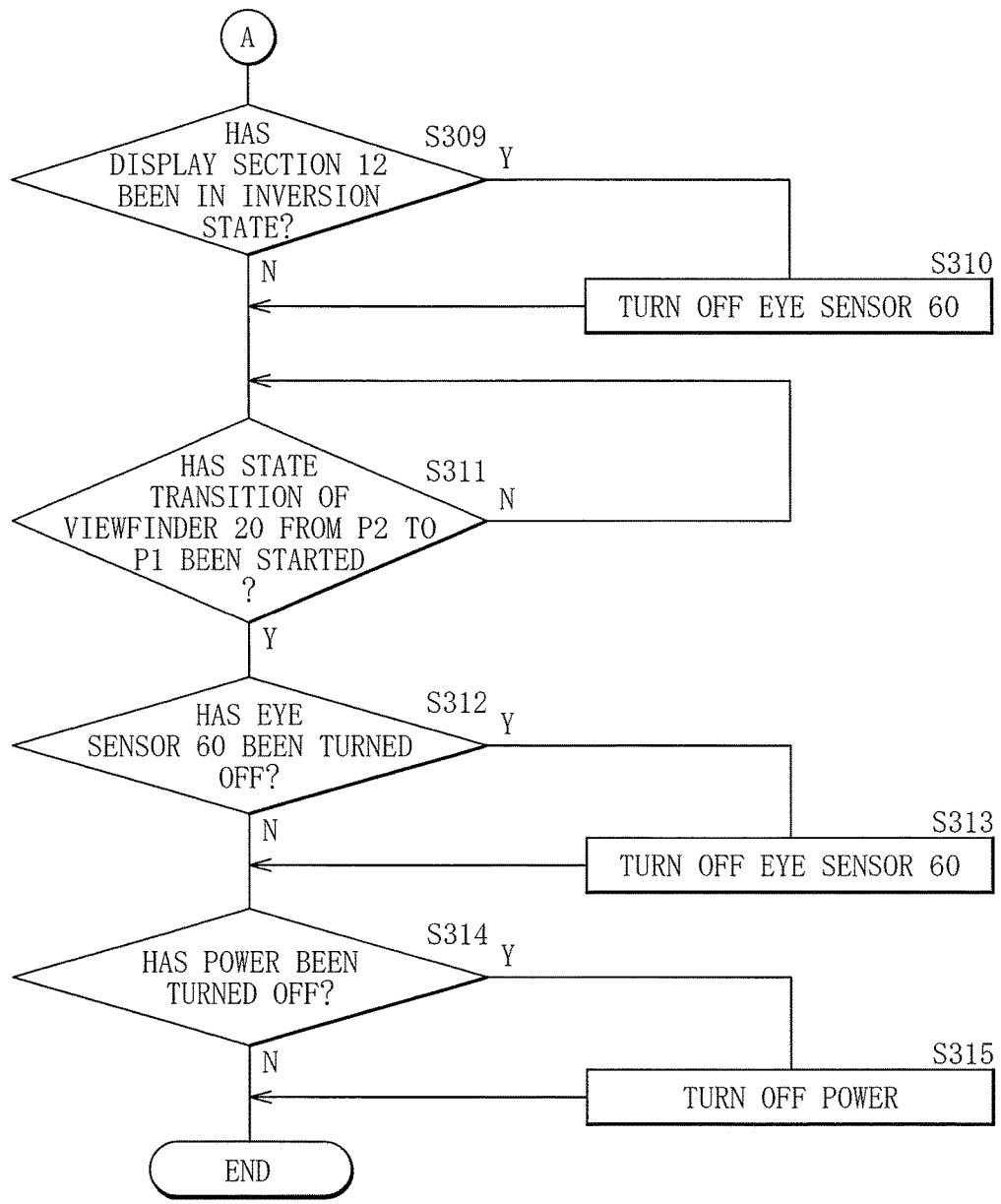
[ FIG. 17B ]

IMAGING APPARATUS

TECHNICAL FIELD

The present disclosure relates to an imaging apparatus including a viewfinder.

BACKGROUND ART

In related art, there has been an imaging apparatus having a viewfinder that is foldable along a main body or is housed inside the main body in consideration of downsizing when being carried (for example, see PTL 1 or PTL 2). A user draws the viewfinder forward and uses the viewfinder.

CITATION LIST

Patent Literature

PTL 1: Japanese Unexamined Patent Application Publication No. S60-121431
PTL 2: Japanese Unexamined Patent Application Publication No. 2001-268402

SUMMARY

However, improvement of operability is recently desired together with further downsizing of the entire configuration.

Therefore, it is desirable to provide an imaging apparatus excellent in operability.

An imaging apparatus according to an embodiment of the present disclosure includes: a main body provided with an imaging section; a viewfinder that makes a state transition between a housed state in which the viewfinder is housed in the main body and a usage state in which the viewfinder is projected from the main body; and a control section that turns on or turns off power in response to the state transition.

In the imaging apparatus according to the embodiment of the present disclosure, the control section turns on or turns off power in response to the state transition of the viewfinder. Therefore, it is unnecessary for a user to turn on or turn off power through, for example, operation of the power button.

According to the imaging apparatus of the embodiment of the present disclosure, operability is improved and smooth photographing by the user becomes possible. Note that effects of the present disclosure are not limited thereto, and effects achieved by the technology may be one or more of effects described below.

BRIEF DESCRIPTION OF DRAWINGS

FIG. 1 is a perspective view of an appearance of an imaging apparatus according to an embodiment of the disclosure.

FIG. 2 is another perspective view of the appearance of the imaging apparatus illustrated in FIG. 1.

FIG. 3 is a front view of the imaging apparatus illustrated in FIG. 1.

FIG. 4 is a perspective view of a state in which a viewfinder is projected upward from a main body in the imaging apparatus illustrated in FIG. 1.

FIG. 5 is another perspective view of the state in which the viewfinder is projected upward from the main body in the imaging apparatus illustrated in FIG. 1.

FIG. 6 is a perspective view of the viewfinder of the imaging apparatus illustrated in FIG. 1, in a usage state.

FIG. 7 is another perspective view of the viewfinder of the imaging apparatus illustrated in FIG. 1, in the usage state.

FIG. 8 is a perspective view of a configuration of the viewfinder of the imaging apparatus illustrated in FIG. 1, in a housed state.

FIG. 9 is a perspective view of the configuration of the viewfinder of the imaging apparatus illustrated in FIG. 1, in the usage state.

FIG. 10A is a front view and a side view of a configuration of a viewfinder unit illustrated in FIG. 8, in the housed state.

FIG. 10B is a side view of the configuration of the viewfinder unit illustrated in FIG. 8, in the usage state.

FIG. 11A is a side view of a schematic configuration of a viewfinder as a modification of the imaging apparatus illustrated in FIG. 1, in the housed state.

FIG. 11B is a side view of the schematic configuration of the viewfinder illustrated in FIG. 11A, in the usage state.

FIG. 12 is a perspective view of a state in which a display surface of a display section faces object side, in the imaging apparatus illustrated in FIG. 1.

FIG. 13A is a perspective view of a main part of the imaging apparatus illustrated in FIG. 1, in an enlarged manner.

FIG. 13B is a sectional diagram illustrating a sectional surface including an eye sensor illustrated in FIG. 13A, in an enlarged manner.

FIG. 14 is a block diagram illustrating a schematic configuration of the imaging apparatus illustrated in FIG. 1.

FIG. 15 is a flowchart illustrating processes executed in the imaging apparatus according to a first embodiment.

FIG. 16A is a flowchart illustrating processes executed in an imaging apparatus according to a second embodiment.

FIG. 16B is a flowchart illustrating a part of the processes illustrated in FIG. 16A in detail.

FIG. 16C is a modification of the flowchart illustrated in FIG. 16A.

FIG. 17A is a flowchart illustrating processes executed in an imaging apparatus according to a third embodiment.

FIG. 17B is a flowchart illustrating processes following the processes of FIG. 17A.

DESCRIPTION OF EMBODIMENTS

Hereinafter, some embodiments of the disclosure are described in detail with reference to drawings. Note that description is given in the following order.
1. First embodiment (an imaging apparatus in which a power source is turned on or off in response to a state transition of a viewfinder)
2. Second embodiment (an imaging apparatus in which display operation and other operation of a display section are performed in response to a state transition of a viewfinder)
3. Third embodiment (an imaging apparatus in which an eye sensor is turned on or off in response to a state transition of a viewfinder)

<First Embodiment>
[1. Configuration of Imaging Apparatus 1]

A basic configuration of an imaging apparatus 1 according to a first embodiment of the disclosure is described with reference to FIG. 1 to FIG. 3 mainly. FIG. 1 illustrates an appearance configuration of the imaging apparatus 1 according to the first embodiment of the disclosure as viewed from front side thereof. FIG. 2 illustrates the appearance configuration of the imaging apparatus 1 as viewed from rear side thereof. FIG. 3 is a front view of the imaging apparatus 1 illustrated in FIG. 1.

The imaging apparatus 1 is a small digital single-lens reflex camera, and, for example, may include a main body 10, a viewfinder 20, and an imaging lens unit 30. The viewfinder 20 may make a state transition between a housed state P1 in which the viewfinder 20 is housed in the main body 10 (FIG. 3) and a usage state P3 (described later) in which the viewfinder 20 is projected (exposed) to outside from the main body 10. Note that, in FIG. 3, the viewfinder 20 in the housed state P1 is illustrated by a dashed line, and the viewfinder 20 in a popup state P2 during the transition from the housed state P1 to the usage state P3 is illustrated by a solid line. The viewfinder 20 is described in detail later. In the imaging apparatus 1, a mode in which one or both of power-on operation and power-off operation are executed in response to the state transition of the viewfinder 20 is selected by a control section 6 described later.

In the following description, lens side (object side) is referred to as front side, and display section side (image side) is referred to as rear side in a front-rear direction Z of the main body 10. Note that the front-rear direction Z is the same as an optical axis direction of a lens (not illustrated) coupled to the main body 10. Also, a horizontal direction of the main body 10 is referred to as an X direction, and right and left are indicated in a state of facing the front side from the rear side of the main body 10. A vertical direction of the main body 10 is referred to as a Y direction.

The main body 10 may have, for example, a rectangular parallelepiped shape, and a body mount 11 is provided on a front surface 10A. An imaging device 2A, an image signal processing section 3 (both described later), and other components are housed inside the main body 10. A display section 12 is provided on a rear surface 10B of the main body 10.

The body mount 11 allows mechanical coupling or electrical coupling between the main body 10 and the interchangeable imaging lens unit 30, and a user may select a lens according to the intended use and couple the selected lens to the main body 10. The imaging lens unit 30 has a lens barrel 30B that houses one or more lenses 30A, and lens rings 30C and 30D that are provided around the lens barrel 30B. The lens rings 30C and 30D may be mechanical keys to perform, for example, manual setting of an aperture, a shutter speed, and a photographing mode, or manual operation of focusing or zooming. The lens rings 30C and 30D configure a part of an input section 8 (described later). Note that the number of lens rings is not particularly limited. The lens ring may not be provided.

The imaging device 2A configures an imaging section 2 (described later), together with the imaging lens unit 30 and other components, and causes an image of the object to be formed on a light receiving surface through the imaging lens unit 30, thereby generating an electric signal through photoelectric conversion. Examples of the imaging device 2A may include a charge coupled device (CCD) image sensor and a complementary metal oxide semiconductor (CMOS) image sensor.

The display section 12 displays, on a display surface 12A, a through image under imaging obtained through the imaging lens unit 30, an image recorded in a memory medium 7A (described later) in the main body 10 or any other medium, or various information such as a remaining amount of the battery and photographing conditions. Examples of the photographing conditions may include a shutter speed, an aperture, an f-number, a levelness, and presence or absence of flash. In addition, the display section 12 may function as a touch panel that has a touch panel section (not illustrated) and displays operation images such as a user interface image. The display section 12 may be configured of, for example, a liquid crystal panel (LCD), or an organic electroluminescence (EL) panel. As described later, the display section 12 may be rotatably coupled to the main body 10. Further, the display operation of the display section 12 may be started or terminated by the control section 6, for example, in response to the state transition of the viewfinder 20.

The viewfinder 20 is to perform visual confirmation of an image to be photographed, composition setting, focusing, and other operation. The viewfinder 20 may be configured of, for example, an optical viewfinder (OVF) or an electronic viewfinder (EVF). In the case of the electronic viewfinder, the viewfinder 20 may have, for example, an eyepiece (not illustrated) and a display screen (not illustrated) such as a liquid crystal panel and an organic EL panel, at the back of a viewing window 21 (not illustrated in FIG. 1 to FIG. 3, see FIG. 7 described later). Various information such as a remaining amount of the battery and photographing conditions (for example, a shutter speed, an aperture, an f-number, a levelness, presence or absence of flash) are displayed on the display screen of the viewfinder 20, in addition to the through image under imaging. Information same as or different from those displayed on the display section 12 may be displayed on the display screen of the viewfinder 20. For example, only some of a plurality of pieces of information displayed on the display section 12 may be displayed on the display screen of the viewfinder 20 by the control section 6. Further, the control section 6 may activate the display operation of the viewfinder 20 or other operation, for example, in response to the state transition of the viewfinder 20.

The configuration of the viewfinder 20 is further described with reference to FIG. 4 to FIG. 7 in addition to FIG. 1 to FIG. 3. FIG. 4 is a perspective view of an appearance of the imaging apparatus 1 in the popup state P2 in which the viewfinder 20 is projected upward from the main body 10, as viewed from the front side thereof, and FIG. 5 is a perspective view of the appearance of the imaging apparatus 1 in that state as viewed from the rear side thereof. Further, FIG. 6 and FIG. 7 are perspective views of the viewfinder 20 in the usage state P3 as viewed from the front side and the rear side, respectively. The viewfinder 20 may take three states, that is, the housed state P1, the popup state P2, and the usage state P3. The housed state P1 is a state in which the viewfinder 20 is housed in the main body 10, namely, a state in which a user (a photographer) does not use the viewfinder 20. Note that FIG. 1 to FIG. 3 each illustrate the state in which the entire viewfinder 20 is completely housed inside the main body 10; however, a part of the viewfinder 20 may be exposed. The popup state P2 is a state in which the entire viewfinder 20 is largely projected upward from the main body 10. In the popup state P2, many parts of the viewfinder 20 are exposed to the outside from the main body 10 as compared with the housed state P1. In addition, the usage state P3 is a state appropriate for use of the viewfinder 20 by a user (a photographer), and is a state in which a movable part 222 (described later) that is a part of the viewfinder 20 is advanced to the rear side of a main body part 221 (described later) from the popup state P2. In the usage state P3, an image on the display screen provided inside the viewfinder 20 is clearly recognized by the user without being blurred. As mentioned above, the viewfinder 20 is movable in two or more directions (the vertical direction and the front-rear direction) in the state transition between the housed state P1 and the usage state P3 in which the viewfinder 20 is projected to the outside of the main body 10. This results in downsizing of the entire configuration of the imaging apparatus 1.

The viewfinder 20 may be elongated above the main body 10 (in a direction of an arrow A1) from the housed state P1 (see FIG. 1 to FIG. 3), for example, as illustrated in FIG. 4 and FIG. 5, and then comes up to the popup state P2. The movable part 222 further advances to the rear side of the main body 10 (in a direction of an arrow A2) from the popup state P2 as illustrated in FIG. 6 and FIG. 7, and then the viewfinder 20 comes up to the usage state P3. Elongating the viewfinder 20 above the main body 10 causes the viewing window 21 to be located above the main body 10. This makes it possible to approximate the configuration of the imaging apparatus 1 to the configuration of a normal digital single-lens reflex camera in which the viewfinder 20 is located above the lens barrel and the display section 12, which allow for improvement in usability for the user. Moreover, advancing a part of the viewfinder 20 to the rear side of the main body 10 makes it possible to reduce clearance from an eye and to enhance shielding property.

As an advancing amount of the viewfinder 20 to the rear side of the main body 10, for example, an eyepiece surface 22A of the viewfinder 20 may be preferably projected rearward more than the rear surface 10B (the display section 12) of the main body 10. This is because the projection reduces a clearance from an eye and reduces the possibility that the nose of the user touches the display section 12 to improve usability.

The main body 10 may preferably have, on a top surface 10C, an opening 13 through which the viewfinder 20 moves into and out of the main body 10. This makes it possible to provide an opening 21 through which the viewfinder 20 moves into and out of the main body 10, at a position other than the rear surface 10B of the main body 10, which facilitates handling of diameter enlargement of the lens barrel and screen enlargement of the display section 12. Incidentally, if the opening 13 is provided on the rear surface 10B of the main body 10, it is necessary to increase the size of the main body 10, or if the size of the main body 10 is not changed, the size of the lens barrel is decreased, and therefore, magnification is lowered, brightness becomes dark, and the size of the imaging device is also decreased. In addition, the size of the display section 12 is also decreased.

Note that the position of the opening 13 illustrated in FIG. 1 to FIG. 3 is a position where, for example, a stroboscope is disposed in a typical digital single-lens reflex camera. In the present embodiment, the position of a stroboscope 14 is changed, and the stroboscope 14 is disposed at a position closer to the center than the opening 13.

As illustrated in FIG. 3 mentioned above, the viewfinder 20 may be preferably provided at a position not overlapped with the body mount 11. This makes it possible to avoid interference between the viewfinder 20 and the lens barrel. Note that the viewfinder 20 may be overlapped with the display section 12 in a back view.

The detailed configuration of the viewfinder 20 is further described with reference to FIG. 8 to FIGS. 10A and 10B, in addition to FIG. 1 to FIG. 7. FIG. 8 is a perspective view of an appearance of the viewfinder 20 in the housed state P1 illustrated in FIG. 1 to FIG. 3. FIG. 9 is a perspective view of the appearance of the viewfinder 20 in the popup state P2 and the usage state P3 illustrated in FIG. 4 to FIG. 7. FIG. 10A is a front view and a side view of the configuration of a viewfinder unit 22 illustrated in FIG. 8, in the housed state P1 and the popup state P2. FIG. 10B is a side view of an appearance of the viewfinder unit 22 illustrated in FIG. 8, in the usage state P3.

The viewfinder 20 may include, for example, the viewfinder unit 22, a decorative member 23, a first moving mechanism 24, a second moving mechanism 25 (see FIG. 10A and FIG. 10B), and a visibility adjustment section 26 (see FIG. 6, FIG. 7, and FIG. 9).

The viewfinder unit 22 is a part exposed to the outside of the main body 10 in the popup state P2 and the usage state P3, and may include, for example, the main body part 221 that elongates in an upward direction to the main body 10, and the movable part 222 that elongates in a rearward direction to the main body part 221. The viewfinder unit 22 further includes the above-described viewing window 21 (see FIG. 5 and FIG. 7), and an eyepiece lens and a display screen (both not illustrated) that are provided at the back of the viewing window 21.

The decorative member 23 covers the side surfaces and the rear surface of the viewfinder unit 22 except for the viewing window 21, and trims the appearance of the viewfinder 20 and the imaging apparatus 1. The decorative member 23 may include, for example, a top surface decorative member 23A and a side surface decorative member 23B. The top surface decorative member 23A configures a part of the exterior member of the top surface 10C of the main body 10 when the viewfinder 20 is in the housed state P1. The side surface decorative member 23B covers the side surfaces and the rear surface of the viewfinder unit 22 when the viewfinder 20 is in the popup state P2 and the usage state P3.

The side surface decorative member 23B may preferably have a cutout 23C that avoids the body mount 11. This makes it possible to dispose the viewfinder 20 while avoiding the body mount 11 as illustrated in FIG. 3.

The first moving mechanism 24 lifts up the viewfinder unit 22 above the main body 10, and may be configured of, for example, a mechanical moving mechanism. More specifically, the first moving mechanism 24 includes a base frame 31, a slide frame 32, a first elastic member 33, and a hooking mechanism 34. The base frame 31 and the slide frame 32 have a double cylinder structure in which the slide frame 32 is inserted into the base frame 31. Note that the inside of each of the base frame 31 and the slide frame 32 may be preferably hollowed so as to house, for example, a battery of the stroboscope 14.

The base frame 31 may include, for example, a base frame main body 31A made of a metal plate or other material, a projection part 31B, a pivot regulating part 31C, and a pressing part 31D. The base frame main body 31A may be fixed to, for example, the main body 10. Moreover, one end 33A of the first elastic member 33 is fixed to the base frame main body 31A. Further, a long hole 31E that defines a moving range of the other end 33B of the first elastic member 33 is provided in the base frame main body 31A. The projection part 31B is a part that holds the hooking mechanism 34, and is configured integrally with the pivot regulating part 31C and the pressing part 31D. The pivot regulating part 31C regulates the pivot range of the hooking mechanism 34, and is provided in a guide groove 34B of the hooking mechanism 34. The pressing member 31D prevents a hook part 34C of the hooking mechanism 34 from being detached from a hole 32B of the slide frame 32.

The slide frame 32 may include, for example, a slide frame main body 32A made of a metal plate or other material, and the hole 32B. The slide frame main body 32A is fixed, with a screw 32C (see FIG. 9), to the decorative member 23 that covers the viewfinder unit 22. The hole 32B receives the hook part 34C of the hooking mechanism 34 to hold the viewfinder 20 in the housed state P1.

The first elastic member 33 is provided between the base frame 31 and the slide frame 32, and biases the slide frame 32 upward. The first elastic member 33 may be preferably configured of, for example, a spring. Although the type of the spring is not particularly limited, the spring may be preferably, for example, a tension coil spring or a torsion coil spring. The one end 33A of the first elastic member 33 is fixed to the base frame main body 31A of the base frame 31, and the other end 33B of the first elastic member 33 is fixed to the slide frame main body 32A of the slide frame 32.

The hooking mechanism 34 regulates upward movement of the slide frame 32, and may include, for example, an attachment part 34A, the guide groove 34B, the hook part 34C, and a receiving part 34D. The attachment part 34A is pivotally attached to the projection part 31B of the base frame 31. The guide groove 34B defines the pivot range of the hooking mechanism 34. The pivot regulating part 31C of the base frame 31 is provided in the guide groove 34B. The hook part 34C extends downward from one point of the attachment part 34A. The hook part 34C is engaged with the hole 32B of the slide frame 32, which holds the viewfinder 20 in the housed state P1. The receiving part 34D is a part holding a viewfinder operation section (a button) 10E provided on the side surface 10D of the main body 10. When not in use, the viewfinder operation section 10E is held by the receiving part 34D, which regulates pivot of the attachment part 34A, and therefore a state where the hook part 34C is engaged with the hole 32B of the slide frame 32 is maintained. When in use, the user slides the viewfinder operation section 10E so that the viewfinder operation section 10E is unlocked from the receiving part 34D, which causes the attachment part 34A to pivot. Thus, the hook part 34C is detached from the hole 32B of the slide frame 32.

The second moving mechanism 25 enables the movable part 222 of the viewfinder unit 22 to advance to the rear side of the main body 10, and may be configured of, for example, a mechanical moving mechanism. More specifically, as illustrated in FIG. 10 and FIG. 11, the second moving mechanism 25 has a second elastic member 41. The second elastic member 41 is provided between the viewfinder unit 22 and the decorative member 23, and biases the viewfinder unit 22 rearward (in the Z direction). The second elastic member 41 may be preferably configured of, for example, a spring. Although the type of the spring is not particularly limited, the spring may be preferably, for example, a deformed compression shaped spring. One end 41A of the second elastic member 41 is fixed to a rear surface of the viewfinder unit 22, and the other end 41B of the second elastic member 41 is fixed to the decorative member 23. When not in use, preferably, the viewfinder unit 22 may be pressed by the rear surface 10B of the main body 10 and movement by biasing force of the second elastic member 41 may be suppressed.

Note that the second moving mechanism 25, namely, the second elastic member 41 may be omitted, and the user may draw the movable part 222 of the viewfinder unit 22 rearward by hand.

Moreover, in the above description, the operation of elongating the viewfinder 20 above the main body 10 is performed with use of the first moving mechanism 24 that is a mechanical moving mechanism. Alternatively, as with an imaging apparatus 1A as a modification illustrated in FIG. 11A and FIG. 11B, an electric moving mechanism 27 may be used in place of the first moving mechanism 24.

The imaging apparatus 1A may include, for example, the viewfinder unit 22 and the electric moving mechanism 27. The electric moving mechanism 27 lifts up the viewfinder unit 22 above the main body 10, and may include, for example, a base frame 51, a slide frame 52, a rack 53, and a motor 54. The base frame 51 and the slide frame 52 have a double cylinder structure in which the slide frame 52 is inserted into the base frame 51. Note that the inside of each of the base frame 51 and the slide frame 52 may be preferably hollowed so as to house, for example, the battery of the stroboscope 14. The rack 53 is provided on the slide frame 52. The motor 54 is fixed to the base frame 51, and has a worm gear 54A that is engaged with the rack 53.

When not in use, the viewfinder 20 is in the housed state P1 in the main body 10 (see FIG. 1 to FIG. 3). When in use, the user operates the viewfinder operation section (not illustrated) that is provided on the main body 10, and the motor 54 accordingly rotates. The worm gear 54A attached to a rotary shaft of the motor 54 and the rack 53 are engaged with each other, thereby causing the rack 53 to slide (see FIG. 11B). Accordingly, the slide frame 52 moves above the main body 10, and the viewfinder unit 22 pops up to the outside of the main body 10 (see FIG. 4 and FIG. 5). The lifted slide frame 52 and the lifted viewfinder unit 22 are held at a popup position by self-locking of the worm gear 54A, and the popup state P2 is maintained.

In the popup state P2, rearward movement of the movable part 222 caused by the biasing force of the second elastic member 41 is suppressed by the rear surface 10B of the exterior member of the main body 10 (see FIG. 11A). When the viewfinder unit 22 advances to the outside of the main body 10, however, the movable part 222 advances to the rear side of the main body 10 by the biasing force of the second elastic member 41, and the viewfinder unit 22 is put into the usage state P3 (see FIG. 11B). This allows for full automatic state transition of the viewfinder 20 from the housed state P1 to the usage state P3.

The visibility adjustment section 26 is an operation section (a lever, a knob, a dial, etc.) to adjust diopter of the viewfinder 20 so as to be fitted to eyesight of the user. For example, the visibility adjustment section 26 may be provided on a top surface of the viewfinder unit 22 of the viewfinder 20. Further, the visibility adjustment section 26 is covered with the top surface decorative member 23A of the decorative member 23, in the housed state P1 and the popup state P2 (see FIG. 1 to FIG. 3). In contrast, in the usage state P3, the visibility adjustment section 26 is exposed to the outside from the top surface decorative member 23A of the decorative member 23, thereby becoming operable (see FIG. 6 and FIG. 7). Restricting access to the visibility adjustment section 26 in this way makes it possible to avoid that the visibility adjustment section 26 is unintentionally operated and the setting is accordingly changed. In addition, the projection amount of the visibility adjustment section 26 from the top surface of the viewfinder unit 22 is reduced, and the possibility of reset is also reduced even when the viewfinder 20 is returned from the usage state P3 to the popup state P2 or the housed state P1. Thus, complexity of readjustment of the visibility adjustment section 26 at every time of use is eliminated, which allows for enhancement in usability of the user. Note that the visibility adjustment section 26 is not limited to the mechanical operation section, and may be an electronic operation section. In this case, for example, data for visibility adjustment corresponding to the user may be stored in a memory section (not illustrated) inside the control section 6. Such data for visibility adjustment may be stored, for example, when a release button 16 (described later) is pressed down in the photographing operation.

As mentioned above, the display section 12 is rotatably provided with respect to the main body 10, and the display surface 12A thereof may be directed to the front side (see FIG. 12). The state illustrated in FIG. 12 corresponds to a self-photographing mode in which the user performs imaging with the user himself as an object.

A power button 15, the release button 16, and a mode setting dial 17 that configure a part of the input section 8 are further provided on the top surface 10C of the main body 10. The power button 15 performs power-on operation and power-off operation of the entire imaging apparatus 1. The release button 16 is to perform the photographing operation, and may be a two-stage detection button that detects two states, for example, a half-pressed state and a full-pressed state. When the release button 16 is half-pressed, preparation to capture a recording-use image (a main photographed image) of an object is performed. The preparation may include, for example, automatic focus (AF) control operation and automatic exposure (AE) control operation. In addition, when the release button 16 is further pressed down and is fully pressed, the photographing operation of the main photographed image is performed. The photographing operation indicates a series of operation including exposure operation of the object image with use of the imaging device 2A and predetermined image processing that is performed on an image signal obtained by the exposure operation. Further, the mode setting dial 17 performs setting operation of various kinds of operation modes of the imaging apparatus 1. Examples of the operation modes of the imaging apparatus 1 may include a photographing mode, a play mode playing the photographed images, and a communication mode performing data communication with external devices.

The imaging apparatus 1 may include, for example, an eye sensor 60 in the vicinity of the viewfinder 20, on the rear surface 10B of the main body 10. The eye sensor 60 may use, for example, a magnetic sensor to detect whether the user (a photographer) looks into the viewfinder 20, and switches over the display on the display section 12 and the display of the viewfinder 20. For example, when the eye sensor 60 detects approach of an eye of the user, an image is not displayed on the display surface 12A of the display section 12. This is because, if the image is still displayed on the display surface 12A, image light from the display surface 12A enters the eye of the user looking into the viewing window 21 of the viewfinder 20, which impedes visual confirmation of the display screen inside the viewfinder 20.

Note that the imaging apparatus 1 may include, in place of the eye sensor 60, an eye sensor 60A in the vicinity of the viewing window 21 of the viewfinder 20 in the usage position P3, for example, as illustrated in FIGS. 13A, and 13B. FIG. 13A is a perspective view of the vicinity of the viewing window 21 of the imaging apparatus 1 in an enlarged manner, and FIG. 13B illustrates a sectional configuration of the eye sensor 60A. The eye sensor 60A may include, for example, a sensor window 61, a sensor device 62, and a reflection member 63. The sensor device 62 is provided perpendicularly to the sensor window 61. The reflection member 63 is provided in an optical path LP between the sensor window 61 and the sensor device 62. This enables downsizing of the imaging apparatus 1. For example, the sensor window 61 may be provided on the eyepiece surface 22A of the viewfinder 20 (for example, in a region around the viewing window 21, lower left in FIG. 13A). Providing the eye sensor 60A in the viewfinder 20 in this way makes it possible to provide the eye sensor 60A at a position close to eyes and to enhance detection accuracy.

In addition, in the housed state P1, the eye sensor 60A is hidden inside the main body 10, which decreases the possibility of malfunction.

The sensor device 62 may include, for example, a photodetector 62B on a substrate 62A, and may be mounted on a supporting member 64. The photodetector 62B detects variation of light amount of the incident light that has passed through the sensor window 61, thereby detecting presence of approach of an eye of the user.

The reflection member 63 has a reflection surface 63A that reflects light by a mirror surface to change the traveling path of the light. As illustrated in FIG. 13B, the reflection member 63 may be provided as a member integral with the sensor window 61, or may be provided as a member separated from the sensor window 61.

FIG. 14 is a block diagram illustrating an entire configuration of the imaging apparatus 1. The imaging apparatus 1 includes an imaging section 2, an image signal processing section 3, an encoding-decoding section 4, an image memory 5, the control section 6, a speaker 6A, a motor 6B, a recording-reproducing section 7, the input section 8, and detection sections 9A and 9B, in addition to the display section 12 and the viewfinder 20. The imaging lens unit 30 is included in the imaging section 2.

The imaging section 2 is a mechanism capturing photographed image data. The imaging section 2 may include, for example, the imaging device 2A, a preprocessing section 2B, a timing generator 2C, and a driving section 2D, in addition to the imaging lens unit 30. The imaging device 2A is driven on the basis of a timing signal outputted from the timing generator 2C, photoelectrically converts incident light from an object into a charge amount, thereby outputting the charge amount as an analog imaging signal. The analog imaging signal outputted from the imaging device 2A is provided to the preprocessing section 2B. The preprocessing section 2B may include, for example, a sample and hold/automatic gain control (AGC) circuit, and a video A/D converter. The sample and hold/AGC circuit performs gain control and waveform shaping on the analog imaging signal obtained by the imaging device 2A. The timing generator 2C outputs the timing signal to the imaging device 2A in response to an instruction of the control section 6. In addition, the driving section 2D performs focusing, zooming, shutter speed adjustment, diaphragm adjustment, and other operation of the imaging lens unit 30, under the control of the control section 6.

The image signal processing section 3 performs various kinds of image signal processing such as gradation correction processing, shading correction processing, high band correction (contour correction) processing, and image stabilization processing, on the photographed image data obtained by the imaging section 2.

The encoding-decoding section 4 performs compression processing of the photographed image data that has been subjected to the image signal processing by the image signal processing section 3, and expansion processing of the compressed photographed image data. As for a still image, for example, compression processing and expansion processing of a predetermined still image format such as joint photographic experts group (JPEG) format are performed. In contrast, as for a moving picture, compression processing and expansion processing of a predetermined moving picture format such as moving picture experts group (MPEG) format are performed.

The image memory 5 may be a buffer memory configured of a volatile memory such as a dynamic random access memory (DRAM), and temporarily holds the image data subjected to the predetermined processing by the preprocessing section 2B, the image signal processing section 3, and the encoding-decoding section 4.

The control section 6 may be configured of, for example, a central processing unit (CPU), a random access memory (RAM), and a read-only memory (ROM). Programs to be read and executed by the CPU, etc. are held by the ROM. The RAM is used as a work memory of the CPU. The CPU executes various processing according to the programs held by the ROM and issues commands to control the entire imaging apparatus 1.

The recording-reproducing section 7 may include a recording medium 7A, for example, a semiconductor memory such as a flash memory, a magnetic disk, an optical disk, or a magneto-optical disk, and a media drive 7B. The media drive 7B records, in the recording medium 7A, the compressed photographed image data of a still image format or a moving picture format that is obtained by the encoding-decoding section 4, and reproduces (reads out) various kinds of compressed photographed image data recorded in the recording medium 7A.

The input section 8 is a section through which the user performs various kinds of operation input to the imaging apparatus 1, and may include, for example, a touch panel section included in the display section 12, the power button 15, the release button 16, and the mode setting dial 17 that are provided on the main body 10, and the lens rings 30C and 30D provided in the imaging lens unit 30. The input section 8 detects the input operation of the user, and transmits information corresponding to the input operation (operation input information) to the control section 6.

The detection section 9A has a sensor that detects rotation of the display section 12, and detects whether the display section 12 is in the normal photographing state illustrated in FIG. 1 to FIG. 7 or in the inversion state illustrated in FIG. 12. In other words, the detection section 9A detects whether the display section 12 is in a first rotation state (the normal photographing state in which the display surface 12A faces rearward) or in a second rotation state (the inversion state in which the display surface 12A faces frontward). In contrast, the detection section 9B detects the current state of the viewfinder 20 between the housed state P1 and the usage state P3. A sensor using a mechanical method, an electromagnetic method, or an optical method is employed as the detection sections 9A and 9B. When the detection section 9A detects that the display section 12 is in the self-photographing state (located at the inverted position), the control section 6 selects a mode of stopping the operation of the eye sensor 60.

[2. Photographing Operation by Imaging Apparatus 1]

The imaging apparatus 1 may operate in a manner as illustrated in FIG. 15, for example. FIG. 15 is a first flowchart illustrating a flow of a series of operation from activation to stop of the imaging apparatus 1. In the imaging apparatus 1, the mode to perform one or both of the power-on operation and the power-off operation is selectable by the control section 6, in response to the state transition of the viewfinder 20. For example, the control section 6 performs the power-on operation when the viewfinder 20 makes a transition from the housed state P1 to the usage state P3, or performs the power-off operation when the viewfinder 20 makes a transition from the usage state P3 to the housed state P1. Note that the processing illustrated in FIG. 15 is performed by the control section 6, for example, according to the programs held by the ROM or other memory.

When not in use, the viewfinder 20 is in the housed state P1 in the main body 10 (see FIG. 1 to FIG. 3). At this time, the viewfinder operation section 10E is held by the receiving part 34D of the hooking mechanism 34, which regulates the pivot of the attachment part 34A of the hooking mechanism 34. Thus, the state where the hook part 34C of the hooking mechanism 34 is engaged with the hole 32B of the slide frame 32 is maintained (see FIG. 8).

To perform the photographing operation of the imaging apparatus 1, first, the popup operation for the viewfinder 20 is started. The popup operation is state transition from the housed state P1 in which the viewfinder 20 is housed in the main body 10, to the popup state P2. In other words, the viewfinder operation section 10E is slid to cause the viewfinder unit 22 to pop up from the main body 10. More specifically, sliding the viewfinder operation section 10E unlocks the viewfinder operation section 10E from the receiving part 34D of the hooking mechanism 34, thereby causing the attachment part 34A of the hooking mechanism 34 to pivot. Accordingly, the hook part 34C of the hooking mechanism 34 is released from the hole 32B of the slide frame 32 (see FIG. 9). As a result, the slide frame 32 moves above the main body 10 by the biasing force of the first elastic member 33, and the viewfinder unit 22 pops up to the outside of the main body 10 (see FIG. 4 and FIG. 5). At this time, the detection section 9B determines whether the state transition from the housed state P1 to the popup state P2 has been started, namely, whether the viewfinder 20 has started to move toward the popup state P2 from the housed state P1 (step S101). When the start of the state transition from the housed state P1 to the popup state P2 is detected, it is determined whether the power has been turned on (step S102). When the start of the state transition from the housed state P1 to the popup state P2 is not detected, the process in step S101 is performed again.

When it is determined in step S102 that the power has been already turned on by the power button 15, the display screen of the viewfinder 20 is activated (step S103), and predetermined information and a through image are displayed. At this time, the viewfinder 20 is transited from the popup state P2 to the usage state P3 as well. At this time, the movable part 222 of the viewfinder unit 22 may be advanced to the rear side of the main body 10 with use of the second moving mechanism 25, or the movable part 222 may be drawn rearward by hand. In other words, the state transition from the housed state P1 to the usage state P3 may be fully automatically performed with use of both the first moving mechanism 24 and the second moving mechanism 25, or the state transition may be partially performed manually without use of the second moving mechanism 25. When it is determined in step S102 that the power has not been turned on, the power is turned on (step S104), and the process in step S103 is further performed. Note that, when the viewfinder 20 is in the housed state P1 or the popup state P2 in the power-on operation performed by the power button 15, the control section 6 may preferably perform the display operation of only the display section 12. In contrast, when the viewfinder 20 is in the usage state P3 in the power-on operation performed by the power button 15, the control section 6 may perform the display operation of both the display section 12 and the display screen of the viewfinder 20. At this time, for example, only a part of the plurality of pieces of information displayed on the display section 12 may be displayed on the display screen of the viewfinder 20, by the control section 6.

Thereafter, the control section 6 selects the photographing mode, or instructs to perform the photographing mode (step S105). The photographing modes may be largely classified into, for example, a self-photographing mode and a normal photographing mode, and each of the modes includes a still image imaging mode and a moving picture imaging mode.

Subsequently, after the state transition from the usage state P3 to the popup state P2, the state transition of the viewfinder 20 from the popup state P2 to the housed state P1 is further started. Specifically, the movable part 222 of the viewfinder unit 22 is so pressed forward as to be hidden by the decorative member 23, and then the viewfinder unit 22 and the decorative member 23 are pressed downward to house the viewfinder 20 inside the main body 10. In the state transition from the usage state P3 to the housed state P1, the control section 6 may terminate the function of the display operation and other operation of the viewfinder 20. At this time, the detection section 9B determines, for example, whether the state transition from the popup state P2 to the housed state P1 has been started, namely, whether the viewfinder 20 has started to move toward the housed state P1 from the popup state P2 (step S106). When the start of the state transition from the popup state P2 to the storage state P1 is detected, it is determined whether the power has been turned off (step S107). When the start of the state transition from the popup state P2 to the housed state P1 is not detected, the process in step S106 is performed again.

When it is determined in step S107 that the power has been turned off by the power button 15, the series of operation is ended as is. When it is determined that the power has not been turned off, the power is turned off to end the series of operation (step S108). Note that the control section 6 may continue the photographing mode or may shift to a power saving mode (a sleep mode) without turning off the power, after performing the state transition of the viewfinder 20 from the usage state P3 to the housed state P1.

In FIG. 15, the control section 6 turns on the power with using the transition start from the housed state P1 to the popup state P2 as a trigger, and turns off the power with using the transition start from the popup state P2 to the housed state P1 as a trigger. Alternatively, it may be performed in the following manner in the present technology. For example, the power may be turned on with using, as a trigger, detection of any of the following <1> to <3>.

<1> completion of the transition from the housed state P1 to the popup state P2, that is, arrival of the viewfinder 20 to the popup state P2 after movement from the housed state P1

<2> start of the transition from the popup state P2 to the usage state P3, that is, movement start of the movable part 222 of the viewfinder unit 22 to the rear side of the main body part 221

<3> completion of the transition from the popup state P2 to the usage state P3, that is, completion of the movement of the movable part 222 of the viewfinder unit 22 to the rear side of the main body part 221 and arrival of the viewfinder 20 to the usage state P3

Likewise, the power may be turned off with using, as a trigger, detection of any of the following <4> to <6>.

<4> completion of the transition from the popup state P2 to the housed state P1, that is, arrival of the viewfinder 20 to the housed state P1 after movement from the popup state P2

<5> start of the transition from the usage state P3 to the popup state P2, that is, start of forward movement of the movable part 222 of the viewfinder unit 22 toward the main body part 221

<6> completion of the transition from the usage state P3 to the popup state P2, that is, completion of the forward movement of the movable part 222 of the viewfinder unit 22 toward the main body part 221, and arrival of the viewfinder 20 to the popup state P2

[3. Action and Effects of Imaging Apparatus 1]

As mentioned above, in the imaging apparatus 1, the power-on operation and the power-off operation are performed by the control section 6, in response to the state transition of the viewfinder 20. Therefore, it is unnecessary for the user to perform the power-on operation and the power-off operation afresh through, for example, the operation of the power button 15. Thus, according to the imaging apparatus 1, the operability is improved, and smooth photographing by the user becomes possible.

Further, in the imaging apparatus 1, the viewfinder 20 is movable in two or more directions between the housed state P1 in which the viewfinder 20 is housed inside the main body 10 and the usage state P3 in which the viewfinder 20 is projected outside the main body 10. Therefore, it becomes possible to provide the opening 13 through which the viewfinder 20 moves into and out of the main body 10, at a position other than the rear surface 10B of the main body 10, and it becomes possible to downsize the main body 10 while addressing increase in diameter of the lens barrel and increase in size of the screen of the display section 12.

<Second Embodiment>

To perform the photographing operation of the imaging apparatus 1, the control section 6 may perform various kinds of output operation in accordance with the state transition of the movable part 222 of the viewfinder unit 22. More specifically, the imaging apparatus 1 may operate in a manner, for example, as illustrated in FIGS. 16A and 16B. FIG. 16A is a second flowchart illustrating a flow of a series of operation from activation to stop of the imaging apparatus 1. FIG. 16B is a flowchart illustrating a part of processes (step S203) of FIG. 16A in more detail. In the imaging apparatus 1, a mode to perform various kinds of output operation in accordance with the state transition of the movable part 222 of the viewfinder unit 22 is selectable by the control section 6. The various kinds of output operation may include, for example, an alert display, emission of alert sound, and alert vibration. The series of operation other than mentioned above is substantially similar to that in the above-described first embodiment, and thus description thereof is omitted. Note that the processes illustrated in FIGS. 16A and 16B are also performed by the control section 6 according to the programs held by the ROM, for example.

To perform the photographing operation of the imaging apparatus 1, first, the power is turned on by pressing down of the power button 15 (step S201). Alternatively, as with the above-described first embodiment, the power may be turned on in response to the state transition of the viewfinder 20 between the housed state P and the usage state P3. In this case, the control section 6 may turn on the power at an optional timing between the housed state P1 and the usage state P3. Next, the display screen of the viewfinder 20 is activated, and predetermined information and a through image are displayed (step S202). At this time, the display operation of the display section 12 may be started as well. Various kinds of information such as a remaining amount of a battery and photographing conditions (for example, a shutter speed, an aperture, an f-number, a levelness, and presence or absence of flash) in addition to the through image under imaging are displayed on the display screen of the viewfinder 20. More information may be further displayed on the display section 12. In addition, only information by, for example, characters, figures, or symbols may be displayed on the display section 12 without displaying the through image under imaging. Moreover, for example, only part of the plurality of pieces of information displayed on the display section 12 may be displayed on the display screen of the viewfinder 20.

Next, it is determined whether the viewfinder 20 is in the usage state P3 (step S203). Examples of the case where the viewfinder 20 is not in the usage state P3 may include a case where the movable part 222 is not moved to the rear side of the main body 221, namely, a case where a drawn operation is not started, and a case where the movable part 222 starts to move to the rear side of the main body part 221 but the position of the drawn movable part 222 is not appropriate. Alternatively, it is assumed a case where operation of state transition is stopped during full automatic state transition from the housed state P1 to the usage state P3. Specifically, there are a case where the viewfinder 20 may be caught by an inner surface of the opening 13 during the popup operation and stops upward movement, and a case where the movable part 222 drawn from the main body part 221 stops movement due to mechanical friction or other factor. In these cases, an image of the display screen provided inside the viewfinder 20 is blurred even if the user is able to look into the viewing window 21.

In step S203, specifically, processes from step S203A to step S203D illustrated in FIG. 16B are performed. First, it is determined whether the viewfinder 20 has started to move from the housed state P1 to the popup state P2, namely, whether the viewfinder 20 has started the popup operation (step S203A). When it is determined in step S203A that the popup operation has been started, it is determined whether the viewfinder 20 has reached the popup state P2 (step S203B). On the other hand, when it is determined in step S203A that the popup operation has not been started, it is considered that, for example, the user forgets to perform the operation of the viewfinder operation section 10E. Alternatively, it is considered that the user appropriately performs operation of the viewfinder operation section 10E but the viewfinder 20 does not move due to any trouble on the mechanism. In any case, the viewfinder 20 is not allowed to be used as it is, and in this case, for example, alert is displayed on the display section 12 (step S204), and the process returns to step S203A again.

When it is determined in step S203B that the viewfinder 20 has reached the popup state P2, it is further determined whether the viewfinder 20 has started to move from the popup state P2 to the usage state P3 (step S203C). On the other hand, when it is determined in step S203B that the viewfinder 20 has not reached the popup state P2, it is considered that, for example, the user appropriately performs the operation of the viewfinder operation section 10E but the viewfinder 20 does not pop up to an appropriate position due to any trouble on the mechanism. The viewfinder 20 is not allowed to be used as it is, and also in this case, the alert is displayed on the display section 12 (step S204), and the process returns to step S203A (or step S203B) again.

When it is determined in step S203C that the viewfinder 20 has started to move from the popup state P2 to the usage state P3, it is determined whether the viewfinder 20 has reached the usage state P3 (step S203D). On the other hand, when it is determined in step S203C that the viewfinder 20 has not started to move from the popup state P2 to the usage state P3, it is considered that, for example, the user forgets to perform the draw operation of the movable part 222. The display screen inside the viewfinder 20 is recognized indistinctly in this state. Therefore, also in this case, alert is displayed on the display section 12 (step S204), and the process returns to step S203A (or step S203C) again.

When it is determined in step S203D that the viewfinder 20 has reached the usage state P3, the process in step S203 is completed. On the other hand when it is determined in step S203D that the viewfinder 20 is not in the usage state P3, it is considered that, for example, the user starts the draw operation of the movable part 222 but the user does not perform the draw operation to the appropriate position. The display screen inside the viewfinder 20 is recognized indistinctly in this state. Therefore, also in this case, the alert is displayed on the display section 12 (step S204), and the process returns to step S203A (or step S203D) again.

In step S204, the speaker 6A (FIG. 14) provided on the main body 10 may emit alert sound, or the motor 6B (FIG. 14) provided on the main body 10 may perform alert vibration, in addition to the alert display on the display section 12, or together with the alert display on the display section 12. Alternatively, in step S204, the alert display on the display section 12 is not performed, and one or both of emission of the alert sound and the alert vibration may be performed.

After the process in step S203 is completed, the control section 6 selects the operation mode, or instructs to perform the operation mode (step S205). Examples of the photographing modes may include a still image imaging mode and a moving picture imaging mode.

Subsequently, the viewfinder 20 is caused to make a transition from the usage state P3 to the housed state P1 in which the viewfinder 20 is housed in the main body 10, through the popup state P2 (step S206). In other words, the viewfinder unit 22 is so pressed forward as to be hidden by the decorative member 23, and then the viewfinder unit 22 and the decorative member 23 are pressed downward to house the viewfinder 20 inside the main body 10. In the state transition from the usage state P3 to the housed state P1, the control section 6 may terminate the function of the display operation and other operation of the viewfinder 20.

Next, it is determined whether the power has been turned off by the control section 6 (step S207), and when it is determined that the power has been already turned off by the operation of the power button 15, the series of operation is ended as it is. When it is determined that the power has not been turned off, the power is turned off to terminate the series of operation (step S208). Note that the control section 6 may continue the photographing mode or may shift to the power saving mode (the sleep mode) without turning off the power, after performing the state transition of the viewfinder 20 from the usage state P3 to the housed state P1.

As mentioned above, in the present embodiment, the various kinds of output operation are performed by the control section 6, in response to the state transition of the viewfinder 20. Therefore, the user is allowed to instantaneously recognize whether the viewfinder 20 is in the appropriate usage state. Thus, according to the present embodiment, the operability is improved and smooth photographing by the user becomes possible.

Note that, although the power is turned on by pressing down of the power button 15, etc. in the present embodiment (step S201), the power may be turned on in the state transition of the viewfinder 20 from the housed state P1 to the usage state P3, as with the first embodiment.

Moreover, in the present embodiment, for example, as with a flowchart as a modification illustrated in FIG. 16C, the order of step S202 and step S203 may be exchanged. In other words, after the power is turned on (step S201), the usage state P3 of the viewfinder 20 is confirmed (step S203), and then the display screen of the viewfinder 20 may be activated (step S202).

<Third Embodiment>

To perform the photographing operation of the imaging apparatus 1, the control section 6 may perform activation and operation stop of the eye sensor 60, in response to the state transition of the viewfinder 20. More specifically, the imaging apparatus 1 may operate in a manner as illustrated in FIGS. 17A and 17B, for example. FIGS. 17A and 17B are third flowcharts illustrating a flow of a series of operation from activation to stop of the imaging apparatus 1. The series of operation other than mentioned above is substantially similar to that in the above-described first embodiment, and thus description thereof is omitted. Note that the processes illustrated in FIGS. 17A and 17B are also performed by the control section 6 according to the programs held by the ROM, for example.

In the present embodiment, the control section 6 selects a mode to perform one or both of turning on and turning off of the eye sensor 60, in response to the state transition of the viewfinder unit 22. Further, the control section 6 may change assignment of functions of a plurality of mechanical keys depending on a case where the eye sensor 60 detects that the viewfinder 20 is used by the user and other cases. The case where the eye sensor 60 detects that the viewfinder 20 is used by the user indicates a case where it is detected that the eye of the user approaches the viewing window 21 of the viewfinder 20. In addition, change of the assignment of functions of the plurality of mechanical keys indicates that, for example, the functions of the lens rings 30C and 30D provided around the lens barrel 30B are changed depending on whether the user looks into the viewing window 21 of the viewfinder 20. More specifically, for example, when the user does not look into the viewing window 21, the lens ring 30C may function as an operation section to set the shutter speed. When the user looks into the viewing window 21, the lens ring 30C may function as an operation section to perform focusing. Note that the assignment of functions of the plurality of mechanical keys is not limited thereto.

To perform the photographing operation of the imaging apparatus 1, first, the state transition of the viewfinder 20 from the housed state P1 in which the viewfinder 20 is housed in the main body 10 to the popup state P2 is started. In other words, the viewfinder operation section 10E is slid to cause the viewfinder unit 22 to pop up from the main body 10.

At this time, the detection section 9B determines whether the state transition from the housed state P1 to the popup state P2 has been started, namely, whether the viewfinder 20 has started to move from the housed state P1 to the popup state P2 (step S301). When the start of the state transition from the housed state P1 to the popup state P2 is detected, it is determined whether the power has been turned on (step S302). When the start of the state transition from the housed state P1 to the popup state P2 is not detected, the process in step S301 is performed again.

When it is determined in step S302 that the power has been already turned on by the power button 15, the display screen of the viewfinder 20 is activated (step S303), and predetermined information and a through image are displayed. At this time, the viewfinder 20 is transited from the popup state P2 to the usage state P3 as well. When it is determined in step S302 that the power has not been turned on, the power is turned on (step S304), and further the process in step S303 is performed. Note that, when the viewfinder 20 is not in the usage state P3 in the power-on operation performed by the power button 15, the control section 6 may preferably perform display operation of only the display section 12. Moreover, the power may be automatically turned on in the state transition of the viewfinder 20 from the housed state P1 to the usage state P3 (at any timing in the transition from the housed state P1 to the usage state P3). Furthermore, for example, only a part of the plurality of pieces of information displayed on the display section 12 may be displayed on the display screen of the viewfinder 20.

Subsequently, the control section 6 turns on the eye sensor 60 (step S305), and then determines whether the user looks into the viewing window 21, with use of the eye sensor 60 (step S306). When it is determined that the user looks into the viewing window 21, the display of the display surface 12A of the display section 12 is turned off (step S307). Thereafter, the control section 6 selects the photographing mode or instructs to perform the photographing mode (step S308). Then, the detection section 9A detects whether the display section 12 is in the first rotation state (the normal photographing state) illustrated in FIG. 1 to FIG. 7 or in the second rotation state (the inversion state) illustrated in FIG. 12 (step S309). When it is determined that the display section 12 is in the inversion state, the control section 6 turns off the eye sensor 60 (step S310). In a state where the eye sensor 60 functions, approach of the display section 12 is misidentified as approach of an eye of the user, and the display surface 12A of the display section 12 is turned off. As a result, the user performing self-photographing is not allowed to visually confirm the through image that should be displayed on the display surface 12A.

Subsequently, after the state transition from the usage state P3 to the popup state P2, the state transition of the viewfinder 20 from the popup state P2 to the housed state P1 is further started. Specifically, the movable part 222 of the viewfinder unit 22 is so pressed forward as to be hidden by the decorative member 23, and then the viewfinder unit 22 and the decorative member 23 are pressed downward to house the viewfinder 20 inside the main body 10. In the state transition from the usage state P3 to the housed state P1, the control section 6 may terminate the function of the display operation and other operation of the viewfinder 20. At this time, the detection section 9B determines, for example, whether the state transition from the popup state P2 to the housed state P1 has been started, namely, whether the viewfinder 20 has started to move toward the housed state P1 from the popup state P2 (step S311). When the start of the state transition from the popup state P2 to the housed state P1 is detected, it is determined whether the eye sensor has been turned on (step S312). When the start of the state transition from the popup state P2 to the housed state P1 is not detected, the process in step S311 is performed again.

When it is determined in step S312 that the eye sensor 60 is turned on, the eye sensor 60 is turned off (step S313). Finally, it is determined whether the power has been turned off (step S314). When it is determined that the power has been already turned off through operation of the power button 15, the series of operation is ended as is. When it is determined that the power has not been turned off, the power is turned off to end the series of operation (step S315). Note that the control section 6 may continue the photographing mode or may shift to the power saving mode (the sleep mode) without turning off the power, after performing the state transition of the viewfinder 20 from the popup state P2 to the housed state P1 or turning off the eye sensor 60.

Note that the control section 6 may perform the display operation of only the display section 12 when the viewfinder 20 is not in the usage state P3 in the power-on operation performed by the power button 15. In contrast, when the viewfinder 20 is in the usage state P3 in the power-on operation performed by the power button 15, the control section 6 may perform the display operation of both the display section 12 and the viewfinder 20.

As mentioned above, in the present embodiment, turning-on and turning-off of the eye sensor 60 is performed by the control section 6 in response to the state transition of the viewfinder 20. Therefore, it is unnecessary for the user to perform turning-on operation and turning-off operation of the eye sensor 60 separately from the operation of the state transition of the viewfinder 20. Thus, according to the present embodiment, operability is improved, and smooth photographing by the user becomes possible.

In FIGS. 17A and 17B, the control section 6 turns on the power, activates the display screen of the viewfinder 20, and turns on the eye sensor 60, with using, as a trigger, the start of the transition from the housed state P1 to the popup state P2. Further, the control section 6 turns off the eye sensor 60 and turns off the power with using, as a trigger, the start of the transition from the popup state P2 to the housed state P1. Alternatively, it may be performed in the following manner in the present technology. For example, the turning-on of the power, the activation of the display screen of the viewfinder 20, and the turning-on of the eye sensor 60 may be performed with using, as a trigger, detection of any of the following <1> to <3>.

<1> completion of the transition from the housed state P1 to the popup state P2, that is, arrival of the viewfinder 20 to the popup state P2 after movement from the housed state P1

<2> start of the transition from the popup state P2 to the usage state P3, that is, movement start of the movable part 222 of the viewfinder unit 22 to the rear side of the main body part 221

<3> completion of the transition from the popup state P2 to the usage state P3, that is, completion of the movement of the movable part 222 of the viewfinder unit 22 to the rear side of the main body part 221 and arrival of the viewfinder 20 to the usage state P3

Likewise, the turning-off of the eye sensor 60 and the turning-off of the power may be performed with using, as a trigger, detection of any of the following <4> to <6>.

<4> completion of the transition from the popup state P2 to the housed state P1, that is, arrival of the viewfinder 20 to the housed state P1 after movement from the popup state P2

<5> start of the transition from the usage state P3 to the popup state P2, that is, start of forward movement of the movable part 222 of the viewfinder unit 22 toward the main body part 221

<6> completion of the transition from the usage state P3 to the popup state P2, that is, completion of the forward movement of the movable part 222 of the viewfinder unit 22 toward the main body part 221, and arrival of the viewfinder 20 to the popup state P2

Hereinbefore, although the present disclosure has been described with reference to the embodiments, the present disclosure is not limited to the above-described embodiments, and various modifications may be made. For example, the configurations of the first moving mechanism 24, the second moving mechanism 25, and the electric moving mechanism 27 are not limited to the examples described in the above-described embodiments, and other configuration may be employed.

Moreover, for example, in the above-described embodiments, the case where the viewfinder 20 is movable in two directions, that is, the upward direction and the rearward direction of the main body 10 has been described. The viewfinder 20, however, may be movable in three or more directions without being limited to the two directions. Furthermore, the moving direction and the path of the viewfinder 20 are not particularly limited, and for example, in the case of the vertical position photographing, the viewfinder 20 may be projected in the lateral direction (the X direction) of the main body 10 and then may advance to the rear side of the main body 10 (in the Z direction).

In addition, in the above-described embodiments, the case where the image taken by the main body 10 is displayed on the display section 12 provided in the main body 10 has been described. Alternatively, a display of a smartphone (a multifunctional mobile phone) and a monitor of a personal computer may be used in place of the display section 12.

Furthermore, for example, the forms, the sizes, and the materials of the respective components described in the above-described embodiments are not limited, and the components may be formed of other material in other form with other size.

Moreover, for example, in the above-described embodiments, the configuration of the imaging apparatus 1 has been specifically described. However, all of the components are not necessarily provided, and other components may be further provided.

Note that the effects described in the present specification are illustrative and non-limiting. Effects achieved by the present technology may be effects other than those described above. Moreover, the present technology may be configured as follows.

(1)

An imaging apparatus, including:

a main body provided with an imaging section;

a viewfinder that makes a state transition between a housed state in which the viewfinder is housed in the main body and a usage state in which the viewfinder is projected from the main body; and a control section that turns on or turns off power in response to the state transition.

(2)

The imaging apparatus according to (1), wherein the control section turns on power in the state transition from the housed state to the usage state.

(3)

The imaging apparatus according to (1) or (2), wherein the control section turns off power in the state transition from the usage state to the housed state.

(4)

The imaging apparatus according to any one of (1) to (3), wherein the viewfinder moves in two or more directions in the state transition.

(5)

The imaging apparatus according to (4), wherein the viewfinder includes a main body part and a movable part that is movable with respect to the main body part, and makes a transition to the usage state when the main body part makes a transition from the housed state to a popup state in which the main body part is projected above the main body and the movable part then advances from the popup state to rear side of the main body part.

(6)

The imaging apparatus according to (5), wherein the control section turns on power in the transition from the housed state to the popup state.

(7)
The imaging apparatus according to (6), wherein the control section turns on power at a time of start or completion of the transition from the housed state to the popup state.
(8)
The imaging apparatus according to (6), wherein the control section turns on power at a time of start or completion of the transition from the popup state to the usage state.
(9)
The imaging apparatus according to (5), wherein the control section turns off power in the transition from the popup state to the housed state.
(10)
The imaging apparatus according to (9), wherein the control section turns off power at a time of start or completion of the transition from the usage state to the popup state.
(11)
The imaging apparatus according to (9), wherein the control section turns off power at a time of start or completion of the transition from the popup state to the housed state.
(12)
The imaging apparatus according to any one of (1) to (11), further including a display section that displays an image that is captured by the imaging section, wherein
the control section starts or terminates display operation of the display section in response to the state transition.
(13)
The imaging apparatus according to (12), wherein
the viewfinder is an electronic viewfinder, and
the control section displays a plurality of pieces of information on the display section, and displays a part of the plurality of pieces of information on the electronic viewfinder.
(14)
The imaging apparatus according to any one of (1) to (13), wherein
the viewfinder is an electronic viewfinder, and
the control section activates operation of the electronic viewfinder in the state transition from the housed state to the usage state.
(15)
The imaging apparatus according to any one of (1) to (14), wherein
the viewfinder is an electronic viewfinder, and
the control section stops operation of the electronic viewfinder in the state transition from the usage state to the housed state.
(16)
The imaging apparatus according to (1), further including a display section and a power button through which power is turned on, wherein
the viewfinder is an electronic viewfinder, and
upon turning on the power through the power button, the control section causes only the display section to perform display operation when the electronic viewfinder is in the housed state, and causes both the display section and the electronic viewfinder to perform display operation when the electronic viewfinder is in the usage state.
(17)
The imaging apparatus according to any one of (1) to (16), further including a memory section, wherein
the viewfinder includes a main body part, a movable part movable with respect to the main body part, and a visibility adjustment section that adjusts visibility corresponding to a user, and
visibility adjustment data corresponding to the user by visibility adjustment section is stored in the memory section.

(18)
The imaging apparatus according to (17), further including an operation button, wherein
the visibility adjustment data corresponding to the user is stored in the memory section through operation of the operation button.
(19)
The imaging apparatus according to (18), wherein the operation button is a release button through which photographing operation is performed.

This application is based upon and claims the benefit of priority of the Japanese Patent Application No. 2014-097045, filed on May 8, 2014, and the Japanese Patent Application No. 2014-101707, filed on May 15, 2014, both filed with the Japan Patent Office, the entire contents of these applications are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An imaging apparatus, comprising:
a main body provided with an imaging section;
a viewfinder that makes a state transition between a housed state in which the viewfinder is housed in the main body and a usage state in which the viewfinder is projected from the main body; and
a control section that turns on or turns off power of the imaging apparatus in response to the state transition.

2. The imaging apparatus according to claim 1, wherein the control section turns on power in the state transition from the housed state to the usage state.

3. The imaging apparatus according to claim 1, wherein the control section turns off power in the state transition from the usage state to the housed state.

4. The imaging apparatus according to claim 1, wherein the viewfinder moves in two or more directions in the state transition.

5. The imaging apparatus according to claim 4, wherein the viewfinder includes a main body part and a movable part that is movable with respect to the main body part, and makes a transition to the usage state when the main body part makes a transition from the housed state to a popup state in which the main body part is projected above the main body and the movable part then advances from the popup state to rear side of the main body part.

6. The imaging apparatus according to claim 5, wherein the control section turns on power in the transition from the housed state to the popup state.

7. The imaging apparatus according to claim 6, wherein the control section turns on power at a time of start or completion of the transition from the housed state to the popup state.

8. The imaging apparatus according to claim 6, wherein the control section turns on power at a time of start or completion of the transition from the popup state to the usage state.

9. The imaging apparatus according to claim 5, wherein the control section turns off power in the transition from the popup state to the housed state.

10. The imaging apparatus according to claim 9, wherein the control section turns off power at a time of start or completion of the transition from the usage state to the popup state.

11. The imaging apparatus according to claim 9, wherein the control section turns off power at a time of start or completion of the transition from the popup state to the housed state.

12. The imaging apparatus according to claim 1, further comprising a display section that displays an image that is captured by the imaging section, wherein
the control section starts or terminates display operation of the display section in response to the state transition.

13. The imaging apparatus according to claim 12, wherein the viewfinder is an electronic viewfinder, and
the control section displays a plurality of pieces of information on the display section, and displays a part of the plurality of pieces of information on the electronic viewfinder.

14. The imaging apparatus according to claim 1, wherein the viewfinder is an electronic viewfinder, and
the control section activates operation of the electronic viewfinder in the state transition from the housed state to the usage state.

15. The imaging apparatus according to claim 1, wherein the viewfinder is an electronic viewfinder, and
the control section stops operation of the electronic viewfinder in the state transition from the usage state to the housed state.

16. The imaging apparatus according to claim 1, further comprising a display section and a power button through which power is turned on, wherein
the viewfinder is an electronic viewfinder, and
upon turning on the power through the power button, the control section causes only the display section to perform display operation when the electronic viewfinder is in the housed state, and causes both the display section and the electronic viewfinder to perform display operation when the electronic viewfinder is in the usage state.

17. The imaging apparatus according to claim 1, further comprising a memory section, wherein
the viewfinder includes a main body part, a movable part movable with respect to the main body part, and a visibility adjustment section that adjusts visibility corresponding to a user, and
visibility adjustment data corresponding to the user by the visibility adjustment section is stored in the memory section.

18. The imaging apparatus according to claim 17, further comprising an operation button, wherein
the visibility adjustment data corresponding to the user is stored in the memory section through operation of the operation button.

19. The imaging apparatus according to claim 18, wherein the operation button is a release button through which photographing operation is performed.

* * * * *